(12) United States Patent
Ninose et al.

(10) Patent No.: US 7,571,350 B2
(45) Date of Patent: Aug. 4, 2009

(54) STORAGE SYSTEM AND RECOVERY METHOD THEREOF

(75) Inventors: Kenta Ninose, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 11/396,579

(22) Filed: Apr. 4, 2006

(65) Prior Publication Data
US 2007/0220326 A1    Sep. 20, 2007

(30) Foreign Application Priority Data
Feb. 14, 2006    (JP) .............................. 2006-037101

(51) Int. Cl.
*G06F 11/00* (2006.01)
(52) U.S. Cl. ....................................... 714/20
(58) Field of Classification Search ............... 714/20
See application file for complete search history.

(56) References Cited
U.S. PATENT DOCUMENTS

| | | | | |
|---|---|---|---|---|
| 5,983,277 | A * | 11/1999 | Heile et al. ............... 709/232 |
| 6,594,744 | B1 * | 7/2003 | Humlicek et al. .......... 711/162 |
| 6,795,966 | B1 * | 9/2004 | Lim et al. ................... 718/1 |
| 2002/0156984 | A1 * | 10/2002 | Padovano .................. 711/148 |
| 2004/0193945 | A1 | 9/2004 | Eguchi et al. |
| 2004/0268067 | A1 | 12/2004 | Yamagami |
| 2005/0015416 | A1 | 1/2005 | Yamagami |
| 2005/0172166 | A1 | 8/2005 | Eguchi et al. |
| 2005/0210211 | A1 | 9/2005 | Kodama |
| 2006/0026319 | A1 * | 2/2006 | Rothman et al. ........... 710/100 |
| 2007/0220326 | A1 * | 9/2007 | Ninose et al. ............... 714/17 |

FOREIGN PATENT DOCUMENTS

| | | |
|---|---|---|
| EP | 0602882 A | 6/1994 |
| JP | 2004-252686 | 9/2004 |
| JP | 2005-018738 | 1/2005 |
| JP | 2005-222110 | 8/2005 |
| JP | 2005-267602 | 9/2005 |

OTHER PUBLICATIONS

European Search Report for Appln. EP 06 25 3414, dated Apr. 10, 2007.

* cited by examiner

*Primary Examiner*—Emerson C Puente
(74) *Attorney, Agent, or Firm*—Antonelli, Terry, Stout & Kraus, LLP.

(57) ABSTRACT

There is provided a storage system having a host computer for transmitting and receiving data, and a plurality of storage apparatus provided with volumes for storing the data sent by the host computer including a check point setting unit for setting check points as markers during recovery of each volume of the plurality of storage apparatus, a check point management unit for managing the check points set by the check point setting unit, and a recovery order unit for ordering recovery of the volumes up to the state of the check point for each of the volumes managed by the check point management unit to the plurality of storage apparatus.

14 Claims, 21 Drawing Sheets

FIG.4

| CTGID | JNLG-ID | JNLG-ID | JNLG-ID | JNLG-ID | CPTP |
|---|---|---|---|---|---|
| CTG1 | ST1, JG1 | ST2, JG5 | ST3, JG2 | NULL | addr |
| | | | | | |
| | | | | | |
| | | | | | |
| | | | | | |
| | | | | | |

FIG.6

| CP-CID | CP-JID (ST1, JG1) | CP-JID (ST2, JG5) | CP-JID (ST3, JG2) |
|---|---|---|---|
| CP-C1 | CP-1 | CP-1 | CP-1 |
| CP-C2 | CP-2 | CP-4 | CP-2 |
| CP-C3 | CP-3 | CP-8 | CP-5 |
|  |  |  |  |
|  |  |  |  |
|  |  |  |  |

FIG.10

| CP-CID | CP-TOD |
|---|---|
| CP-C1 | 05/01/10 10:10:10.101010 |
| CP-C2 | 05/01/10 10:10:10.102010 |
| CP-C3 | 05/01/10 10:10:10.523003 |
|  |  |
|  |  |
|  |  |

FIG.19

| CP-CID | CP-TOD |
|--------|--------|
| CP-C1 | 05/01/10 10:10:10.101010 |
| CP-C2 | 05/01/10 10:10:10.102010 |
| CP-C3 | 05/01/10 10:10:10.523003 |
| | |
| | |
| | |

551, 552, 550

STORAGE SYSTEM AND RECOVERY METHOD THEREOF

CROSS-REFERENCES TO RELATED APPLICATIONS

This application relates to and claims priority from Japanese Patent Application No. 2006-37101, filed on Feb. 14, 2006, the entire disclosure of which is incorporated herein by reference.

BACKGROUND

The present invention relates to a storage system and recovery method thereof. In particular, the present invention relates to a data back-up and recovery method for a storage system containing a plurality of storage apparatus.

A method using snapshots of a set of data volumes used by applications to save data and a journal of data written to the data volumes is well-known as a method for backing up (saving) and recovering (restoring) data in a storage system, and this is typically referred to as CDP (Continuous Data Protection) etc.

For example, a typical method using snapshots and a journal is disclosed in Japanese Patent Laid-open Publication No. 2005-18738. In Japanese Patent Laid-open Publication No. 2005-18738, journals are made and accumulated every time a storage apparatus writes data of a host computer to a data volume, and then snapshots of the data volume are acquired at appropriate intervals by the storage apparatus. At the time of recovery, data (a volume image of recovery data, or simply a recovery image) held in a data volume at a specific time specified by an administrator is reproduced using a journal and snapshot that has acquired this data.

Further, technology relating to journal groups as units for reproducing this kind of recovery image is disclosed. This is a management unit where a plurality of data volumes for storage apparatus used by applications is grouped and managed as one, with the plurality of data volumes then being recovered as a group.

Typically, an application saves data by using several data volumes. Because of this, it is necessary to reproduce a recovery image at the same time with respect to a group of data volumes used by an application rather than reproducing recovery image for different times each individual data volume.

In the disclosed journal group technology, a plurality of data volumes contained in a single storage apparatus are grouped and a recovery image for a specific point in time with respect to this plurality of data volumes is reproduced.

Further, in Japanese Patent Laid-open Publication No. 2005-18738, a method of using "target time" is disclosed as a method of designating a specific time for a recovery image. This is a recovery method where an administrator designates a specific time in the past as a specific time at the time of recovery.

In this recovery method, data held in the data volume group can be reproduced from a recovery image by designating a time (hereinafter referred to as a Check Point (CP)) of writing specific data to the data volume group recognized by the application. Further, in this recovery method, data held in the data volume group can be reproduced from the recovery image by designating the time.

This is because, at the time of normal operation, applications, other programs capable of recognizing the application CP or users typically notify the storage apparatus of CP via programs controlling the storage apparatus. Further, the storage apparatus stores CP as special entries of accumulated journals. There is also a method for the administrator to designate the CP at the time of recovery. In this method, data held by the data volume group at a time of being notified of the designated CP can be reproduced from a recovery image.

However, with the storage system described above, it is possible to reproduce a recovery image at a specific time with respect to a plurality of data volumes contained in a single storage apparatus but in the even that an application uses a plurality of data volumes contained in a plurality of storage apparatus, it is not possible to acquire a recovery image for a specific time with respect to a data volume group spanning this plurality of storage apparatus.

Here, providing it is possible to acquire and manage as a group recovery image for a specific time with respect to a data volume group spanning a plurality of storage apparatus is acquired, it is possible to reproduce a recovery image for a specific time with respect to a data volume group spanning a plurality of storage apparatus and therefore provide a storage system with markedly higher operability by ordering the recovery image for the data group at a specific time to plurality of storage apparatus as a group.

SUMMARY

In order to take into consideration the aforementioned point, the present invention provides a storage system and recovery method for dramatically improving operability.

In order to resolve these problems, in the present invention, a storage system having a host computer for transmitting and receiving data, and a plurality of storage apparatus provided with volumes for storing the data sent by the host computer, includes a check point setting unit for setting check points as markers during recovery of each volume of the plurality of storage apparatus, a check point management unit for managing the check points set by the check point setting unit, and a recovery order unit for ordering recovery of the volumes up to the state of the check point for each of the volumes managed by the check point management unit to the plurality of storage apparatus.

Therefore, at the time of reproducing recovery image for volumes, it is possible to reproduce a recovery image for a check point for volumes spanning a plurality of storage apparatus by ordering the plurality of storage apparatus of a check point for volumes spanning a plurality of storage apparatus as a group.

Moreover, in the present invention, a recovery method for a storage system having a host computer for transmitting and receiving data, and a plurality of storage apparatus provided with volumes for storing the data sent by the host computer, includes a first step of setting check points as markers during recovery of each volume of the plurality of storage apparatus, a second step of managing the check points set in the first step, and a third step of ordering recovery of the volumes up to the state of the check point for each of the volumes managed in the second step to the plurality of storage apparatus.

Therefore, at the time of reproducing recovery image for volumes, it is possible to reproduce a recovery image for a check point for volumes spanning a plurality of storage apparatus by ordering the plurality of storage apparatus of a check point for volumes spanning a plurality of storage apparatus as a group.

According to the present invention, check points as markers during recovery of each volume of the plurality of storage apparatus are set, the set check points are managed, and recovery of the volumes up to the state of the check point for each of managed volume is ordered to the plurality of storage apparatus. In this way, when recovery image for the volumes are reproduced, it is possible to reproduce a recovery image for a check point for volumes spanning a plurality of storage apparatus by ordering the plurality of storage apparatus of the check point of the volumes spanning a plurality of storage apparatus as a group, rather than just ordering one storage apparatus. It is therefore possible to implement a storage system and recovery method thereof capable of capable of substantially improving operability.

BRIEF DESCRIPTION OF THE DRAWINGS

FIG. 4 is an outline view showing a configuration of a CTG table of the first embodiment.

FIG. 6 is an outline view showing a configuration for a CP table of the first embodiment.

FIG. 10 is an outline view showing a configuration for a CP table of the second embodiment.

FIG. 19 is an outline view showing a configuration for a CP table of the fourth embodiment.

DETAILED DESCRIPTION

The following is a detailed description of the embodiments of the present invention using the drawings.

(1) FIRST EMBODIMENT

Figure 1:
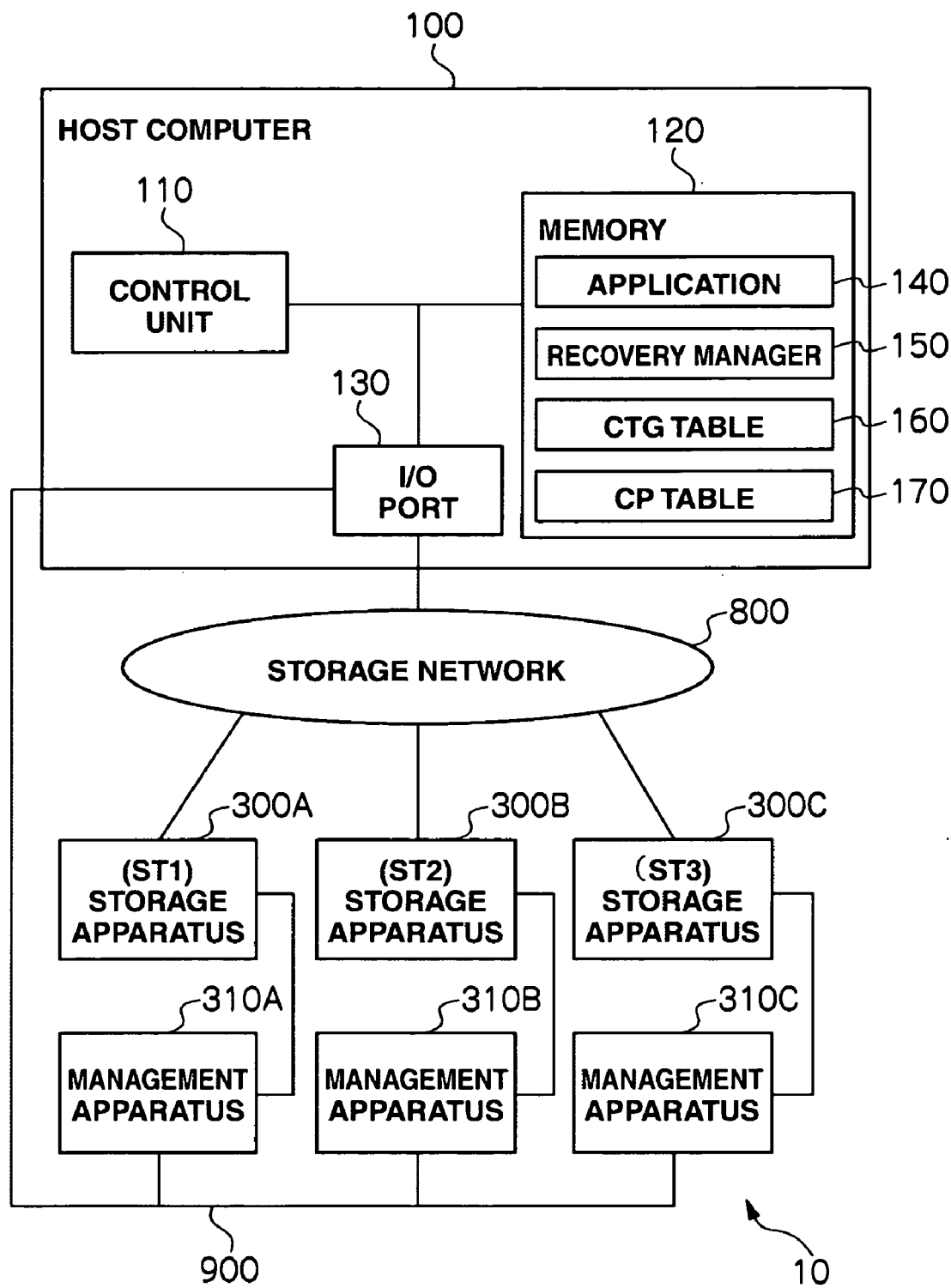
FIG. 1 is an outline view showing a configuration for a storage system of a first embodiment.

FIG. 1 is a view of an overall configuration of a storage system 10 of a first embodiment. The storage system 10 is configured from one or more host computers 100 and a plurality of storage apparatus 300 connected by a storage network 800. An example is shown in FIG. 1 of a configuration of one host computer 100 and three storage apparatus 300.

The three storage apparatus 300 have identifiers of ST1, ST2 and ST3, and are taken to be storage apparatus 300A, storage apparatus 300B, and storage apparatus 300C, respectively. In this embodiment, all of the storage apparatus 300 have the same configuration.

The respective storage apparatus 300 have management apparatus 310, and the respective management apparatus 310 are connected to a management network 900. Further, the host computer 100 is also connected to the management network 900 and it is possible to control the management apparatus 310 from the host computer 100.

The management apparatus 310 have functions for providing orders from the host computer 100 to the storage apparatus 300 and the host computer 100 can control the storage apparatus 300 directly or indirectly by controlling the management apparatus 310 via the management network 900. The management network 900 is capable of being organized so as to use predetermined network technology such as, for example, a LAN (Local Area Network), etc.

In this embodiment, management apparatus 310 the storage apparatus 300A, storage apparatus 300B and storage apparatus 300C are respectively in possession of are taken to be management apparatus 310A, management apparatus 310B and management apparatus 310C.

The host computer 100 has a control unit 110, memory 120, and I/O port 130. The control unit 110 is configured from a CPU and internal memory etc. and controls the whole of the host computer 100.

An application 140, recovery manager 150, CTG table 160 and CP table 170 are stored at the memory 120. Of these, the details of the recovery manager 150, CTG table 160 and CP table 170 are described in the following.

The I/O port 130 is connected to the storage network 800 so as to exchange orders and data etc. with the storage apparatus 300, and is connected to the management network 900 so as to exchange orders etc. with the management apparatus 310.

In addition to this, the host computer 100 has information input apparatus (not shown) such as a keyboard, switches and pointing apparatus, and microphone etc., and also has information output apparatus (not shown) such as monitor displays and speakers etc.

This host computer 100 carries out various processes such as CP acquisition processes and recovery image reproduction processes etc. described later as a result of the control unit 110 calling and executing application 140 and recovery manager 150 from the memory 120.

Figure 2:
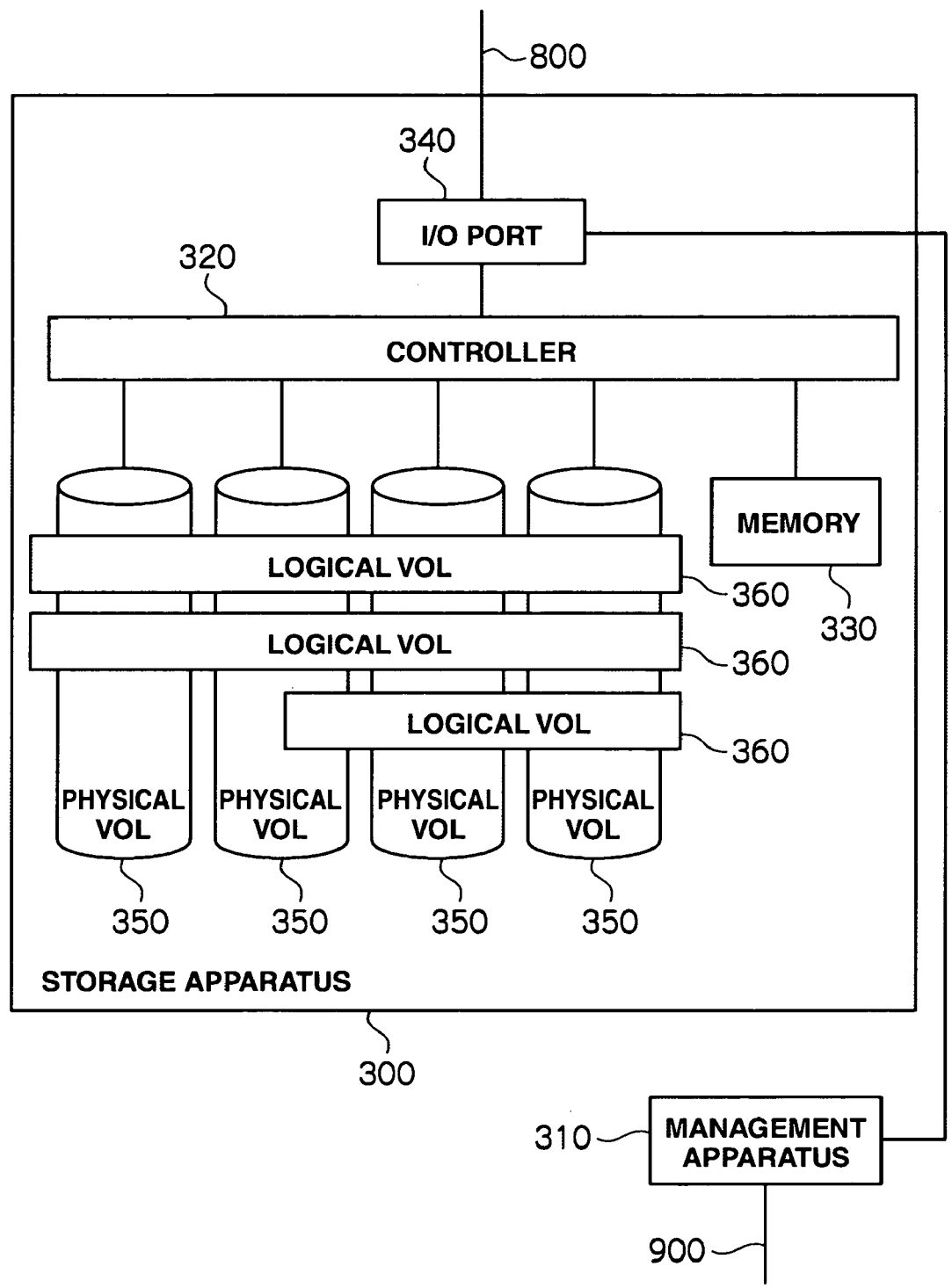
FIG. 2 is another outline view showing a configuration of a storage apparatus of the first embodiment.

FIG. 2 is a configuration view of the storage apparatus 300 of the first embodiment. The storage apparatus 300 includes a controller 320, memory 330, I/O port 340, physical volumes 350, logical volumes 360, and a management apparatus 310 described later.

The controller 320 is configured from a CPU and internal memory etc. and controls the whole of the storage apparatus 300. A program executed by the controller 320 and data used by this program is stored in the memory 330 and is described in detail later. The I/O port 340 is connected to the storage network 800 so as to exchange orders and data etc. with the host computer 100 and is connected with the management apparatus 310 so as to exchange orders etc. with the management apparatus 310.

The physical volume 350 is physical hardware for storing data sent from the host computer 100 and employs a nonvolatile storage apparatus such as a hard disc apparatus etc.

The logical volume 360 is a storage region unit designated for reading and writing of data by the application executed by the host computer 100. In the present invention, the logical volume 360 may be the physical volume 350 mounted as is or may be mounted using a plurality of physical volumes 350 so as to give a RAID (Redundant Arrays Of Inexpensive Disks) configuration.

Management apparatus 310 may also be configured as a computer system consisting of a personal computer etc. having a microprocessor (not shown), internal memory (not shown) and a communication interface etc. so as to constitute an apparatus for maintaining and managing the storage apparatus 300 and constitute an apparatus for indirectly controlling the storage apparatus 300 based on orders from the host computer 100.

Figure 3:
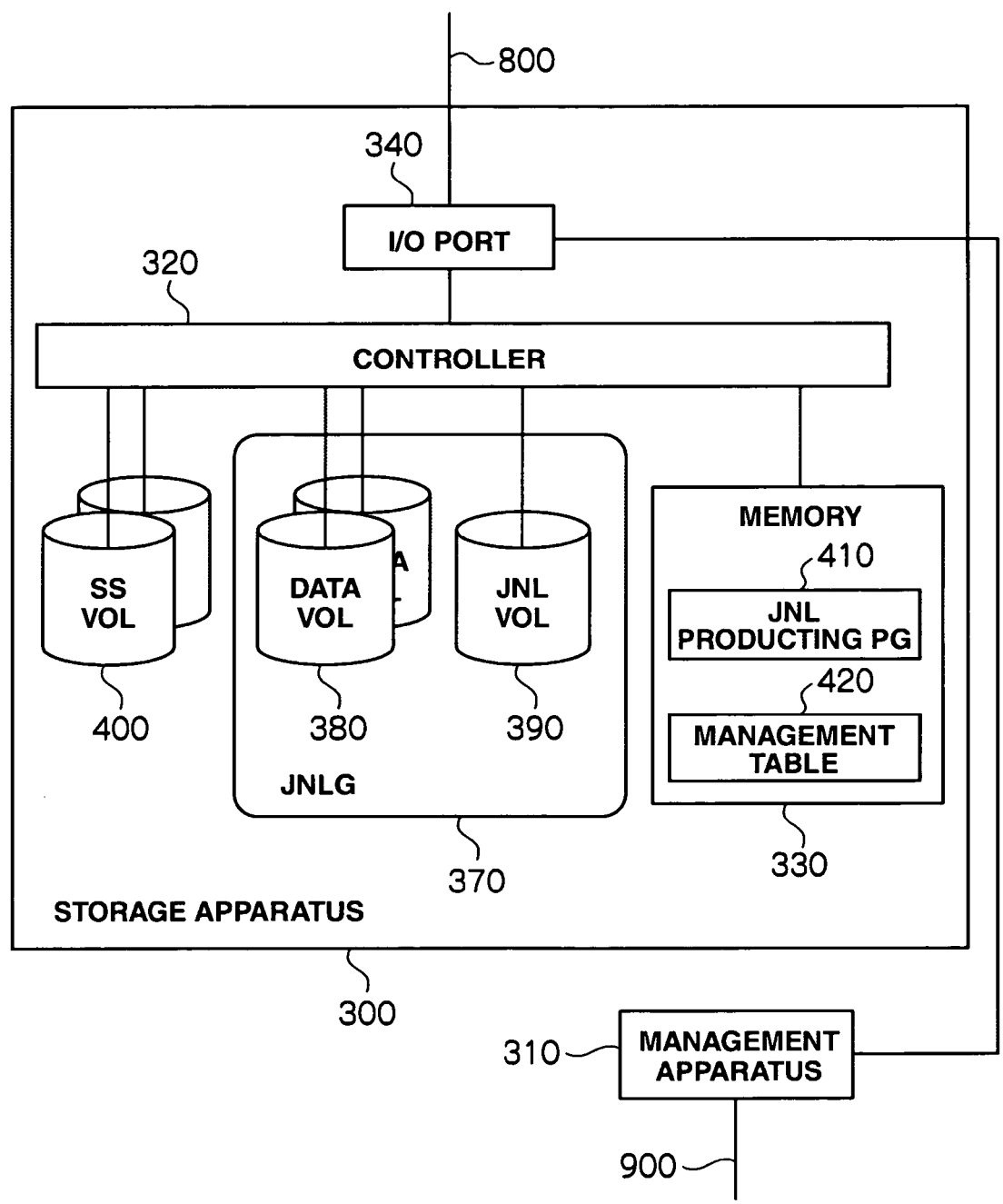
FIG. 3 is a further outline view showing a configuration of a storage apparatus of the first embodiment.

FIG. 3 is a configuration view of a journal group 370 of the storage apparatus 300 of the first embodiment. The storage apparatus 300 has a journal group (JNLG) 370 constituted from one or a plurality of logical volumes 350. A journal group 370 has data volumes (data VOL) 380 and journal volumes (JNVOL) 390. The storage apparatus 300 has snapshot volumes (SSVOL) 400 formed from one or a plurality of logical volumes 350 and corresponding to data volumes 380.

Further, a journal producing program (JNL producing PG) 410 for acquiring journals and snapshots using the journal group 370 and a management table 420 used for the journal producing program 410 to manage the journal group 370 are stored in the memory 330.

This storage apparatus 300 carries out processing for various processes such as journal production processes etc. as a result of the controller 320 calling and executing programs, data used in these programs, and the journal producing program 410 from the memory 330.

In this event, the controller 320 accumulates writes issued by the application 140 to the data volumes 380 as journals in the journal volume 390, accumulates CP acquisition orders acquired from the application 140 or from a user via an information input apparatus etc. in journal volume 390 as special journals, and acquires snapshots of the data volume 380 at appropriate intervals at the snapshot volume 400.

As a result, the controller 320 is capable of reproducing the recovery image corresponding to the designated CP by utilizing the journal and the snapshot. Further, in this embodiment, this kind of process is referred to as recovery.

"CP" indicates a check point recognized by the recovery manager 150 as a point in time of writing specific data to the data volume group. This check point is a marker for during reproduction of a recovery image.

In this embodiment, the application 140 uses data volumes 380 included the plurality of storage apparatus 300. The controller 320 of each storage apparatus 300 reproduces a recovery image for the same point in time by gathering together the data volumes 380 within the respective storage apparatus 300 into a group using the journal group 370.

In addition to the above configuration, at the storage system 10 disclosed in this embodiment, the plurality of storage apparatus 300 included in a data volume 380 are collected together by the recovery manager 150 so as to reproduce the recovery image.

Specifically, at the storage system 10, in order for the data volumes 380 included in a plurality of storage apparatus 300 to be managed as a group, the data volumes 380 included in the respective storage apparatus 300 are managed as a group using the journal group 370, and the journal groups 370 included in the plurality of storage apparatus 300 are managed as a group by the recovery manager 150.

In this way, grouping together the plurality of journal groups 370 is referred to as consistency grouping (hereinafter referred to as CTG (Consistency Group)). The recovery manager 150 designates CP acquisition and recovery image reproduction with respect to the CTG. The physical volumes 350 as a CTG may also be externally connected to the storage apparatus 300. CP acquisition and recovery image reproduction taking the CTG as an object are described in the following.

FIG. 4 is a configuration view of the CTG 160 of the first embodiment. The CTG table 160 is a table for managing journal groups 370 contained in a CTG.

The CTG table 160 includes a CTGID 161 containing an identifier for specifying a CTG, JNLG-ID162 (162A to 162D) indicating journal groups 370 included in the CTG, and pointer information 163 to CP table 170 for managing CP acquired for the CTG. The host computer 100 is capable of obtaining journal groups 370 contained in the CTG from the CTGID specifying the CTG from the CTG table 160 and is capable of obtaining the CP table 170 for managing the CP acquired for the CTG.

An example is shown in FIG. 4 of a CTG table 160 occurring in the configuration for a storage system having three storage apparatus 300 as shown in FIG. 1. Namely, the CTG specified by an identifier of CTG1 is shown to comprise a journal group 370 specified by an identifier of JG1 included in the storage apparatus 300 specified by the identifier of ST1, a journal group 370 specified by an identifier of JG5 contained in the storage apparatus 300 specified by an identifier of ST2, and a journal group 370 specified by an identifier of JG2 contained in the storage apparatus 300 specified by the identifier of ST3.

The CTG specified by the identifier of CTG1 contains three journal groups 370 and an invalid value (NULL) indicating that there is no corresponding journal group 370 entered at JNLG-ID162D. Further, a CP table 170 for managing CP acquired for the CTG specified by the identifier of CTG1 can be obtained from the pointer information 163.

Figure 5:
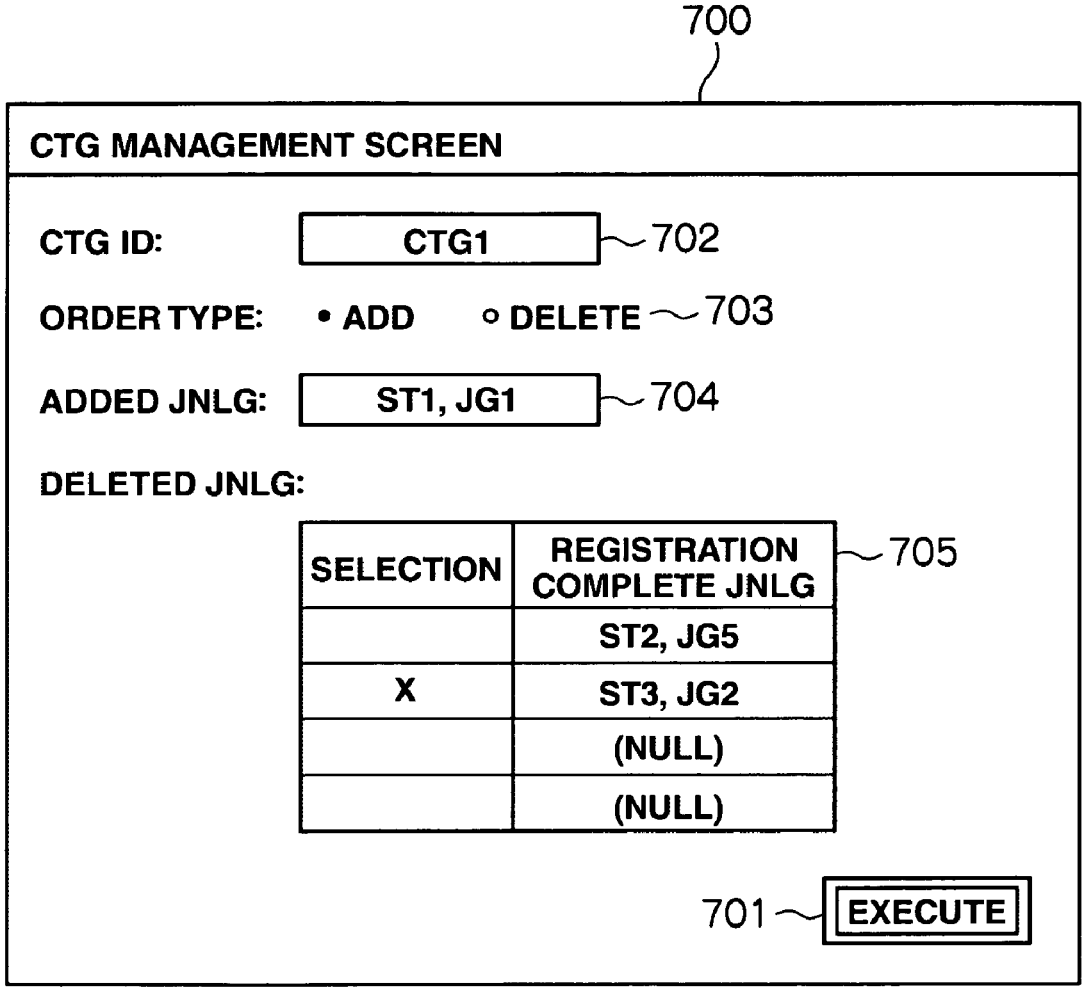
FIG. 5 is an outline view illustrating a setting screen for a CTG table of the first embodiment.

FIG. 5 is a CTG management screen 700 of the recovery manager 120 of the first embodiment. In this embodiment, CTG is configured by grouping a plurality of journal groups 370 contained in the plurality of storage apparatus 300. The recovery manager 150 specifies the journal group 370 as the CTG using the CTG table 160 and it is therefore necessary for the journal group as the CTG to be designated in advance by the user via an information input apparatus, etc.

The CTG management screen 700 shown in FIG. 5 is an example of a screen displayed by the recovery manager 150 when the user designates the CTG configuration via an information input apparatus, etc. When an order to designate a CTG structure is received from the user via an information input apparatus etc., the recovery manager 150 displays the CTG management screen 700. Configuration information for the CTG is then set by the user via an information input apparatus etc. using fields and buttons etc. included at the CTG management screen 700 and transmitted to the recovery manager 150 as a result of pressing down of an execution button 701. The recovery manager 150 then reflects CTG configuration information received from a user via the information input apparatus etc. at the CTG table 160.

The CTG management screen 700 includes an execution button 701, a field 702 designating a CTGID, a field 703 representing the type of CTG configuration order, a field 704 designated a journal group added to the CTG, and a field 705 displaying only journal groups for which registration at the CTG is complete.

The execution button 701 is a button for defining CTG configuration information set at the CTG management screen 700 and transmitting this CTG information to the recovery manager 150. The field 802 designating the CTGID is a field for setting the CTGID in order to specify the CTG designating the configuration using the CTG management screen 700.

The recovery manager 150 specifies a row of the CTG table 160 using CTGID set at the field 802 and stores values set by the user to each field contained in the CTG management screen 700 to each field of the rows of the specified CTG table 160.

The field 703 representing the type of CTG configuration order is a field representing adding and deletion of CTG configuration orders. Two types of orders exist as CTG configuration orders given by the user, one is the addition of a journal group 370 to a CTG, and the other is the deletion of a journal group from a CTG.

In the event that an order "add" is selected at the field 703 representing the type of CTG configuration order, the recovery manager 150 sets information identifying the journal group 370 set at the field 704 designating a journal group to be added to the CTG, more specifically, a set of an identifier for the storage apparatus 300 and an identifier for the journal group 370 to the JNLG-ID162 of the row of the CTG table 160 specified by the field 702 ordering the CTGID.

As a result, the recovery manager 150 stores that the journal group 370 specified by the field 704 is added at the CTG specified by the CTGID. When an initial journal group 370 is added to the CTG, in addition to adding this to the CTG of the journal group 370, the recovery manager 150 makes a new CP table 160 and sets the point information 163 of the CTG table 160.

In the event that a "delete" order is selected at the field 703 representing the type of CTG configuration order, the recovery manager 150 deletes information identifying the journal group 370 displayed at the field 705 displaying the journal groups for which CTG registration is complete, more specifically, a set of an identifier for a storage apparatus 300 and an identifier for a journal group 370 from JNLG-ID162 of the row of the CTG table 160 specified by the CTGID designated at the field 702 designating the CTGID.

As a result, the recovery manager 150 stores that the journal group 370 specified by the field 705 is deleted from the CTG specified by the CTGID.

FIG. 6 is a configuration view of the CP table 170 of the first embodiment. The CP table 170 includes CP-JID172 (172A to 172C) corresponding to journal tables 370 contained in each of the respective storage apparatus 300 and CP-CID171 expressing a grouped check point where the CP-JID's 172 are grouped together and managed as a group. An example is shown in FIG. 6 of a CP table 170 occurring in a system configuration having three storage apparatus 300 as shown in FIG. 1.

The details of the values contained in CP-CID171 and CP-JID172 and its setting method are described later but in this embodiment please note that a CIP-JID172 exists for each journal group 370 contained in the three storage apparatus corresponding to one CP-CID171. For example, in this embodiment, CP-JID172A of FIG. 6 corresponds to the journal group 370 of JG1 occurring at the storage apparatus 300A of ST1.

In this embodiment, a set of one CP-CID171 and a CP-JID172 corresponding to journal groups 370 contained in a plurality of storage apparatus 300 is referred to as an entry of CP table 170. Further, the CP table 170 contains a sufficient number of empty entries.

Figure 7:
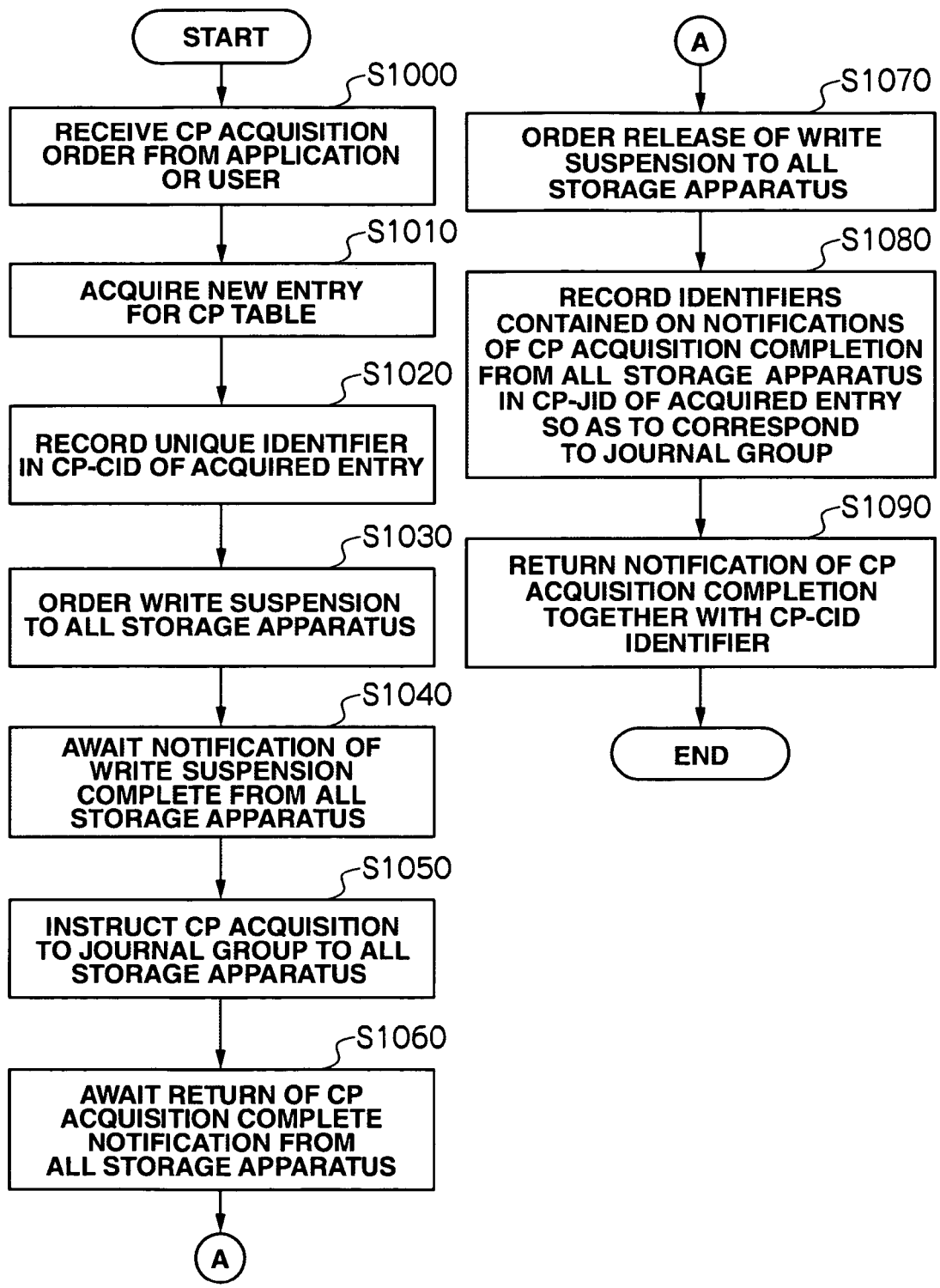
FIG. 7 is a flowchart illustrating a CP acquisition process of the first embodiment.

FIG. 7 is a flowchart showing a CP acquisition process procedure for the recovery manager 150 of the first embodiment. In this embodiment, the application 140 orders the recovery manager 150 to acquire a CP. Namely, the CP acquisition process is a process started up by the control unit 110 when the recovery manager 150 receives a CP acquisition order.

The application 140 orders the recovery manager 150 to acquire a CP at a timing according to an order by the user or at an arbitrary timing.

In step S1000, the recovery manager 150 receives a CP acquisition order from the application 140. Then, in step S1010, the recovery manager 150 acquires a new entry for the CP table 170. Next, in step S1020, the recovery manager 150 registers a unique identifier at the CP-CID171 of the entry acquired in previous step S1010.

Continuing on, the recovery manager 150 then outputs write suspension orders to all of the storage apparatus 300 (step S1030), and awaits the returning of write suspension order completion notification from all of the storage apparatus 300 (step S1040). Next, in step S1050, the recovery manager 150 orders CP acquisition to the journal group for all of the storage apparatus 300.

At this time, storage apparatus 300 receiving the CP acquisition orders store CP in the journal groups 370 contained in the respective storage apparatus 300 and return an identifier specifying the acquired CP to the recovery manager 150 together with CP acquisition completion notification.

In step S1060, when notification of CP acquisition completion is received from the respective storage apparatus 300, the recovery manager 150 orders write suspension release to all of the storage apparatus 300 (step S1060), and registers identifiers indicating CP acquired by the respective journal groups 370 included in the CP acquisition completion notifications in CP-JID172 corresponding to the journal group 370 of the entry acquired in step S1010 (step S1080).

Finally, in step S1090, the recovery manager 150 notifies the application 140 of CP acquisition completion and returns an identifier stored in the CP-CID171 as an identifier indicating CP grouped into a group for CP acquired by the journal groups 370 contained in the plurality of storage apparatus 300.

At the storage system 10 it is then possible to instruct CP stored in each of the journal groups 370 contained in the plurality of storage apparatus 300 as a group using the single identifier stored in the CP-CID171 using this kind of CP acquisition processing.

Figure 8:
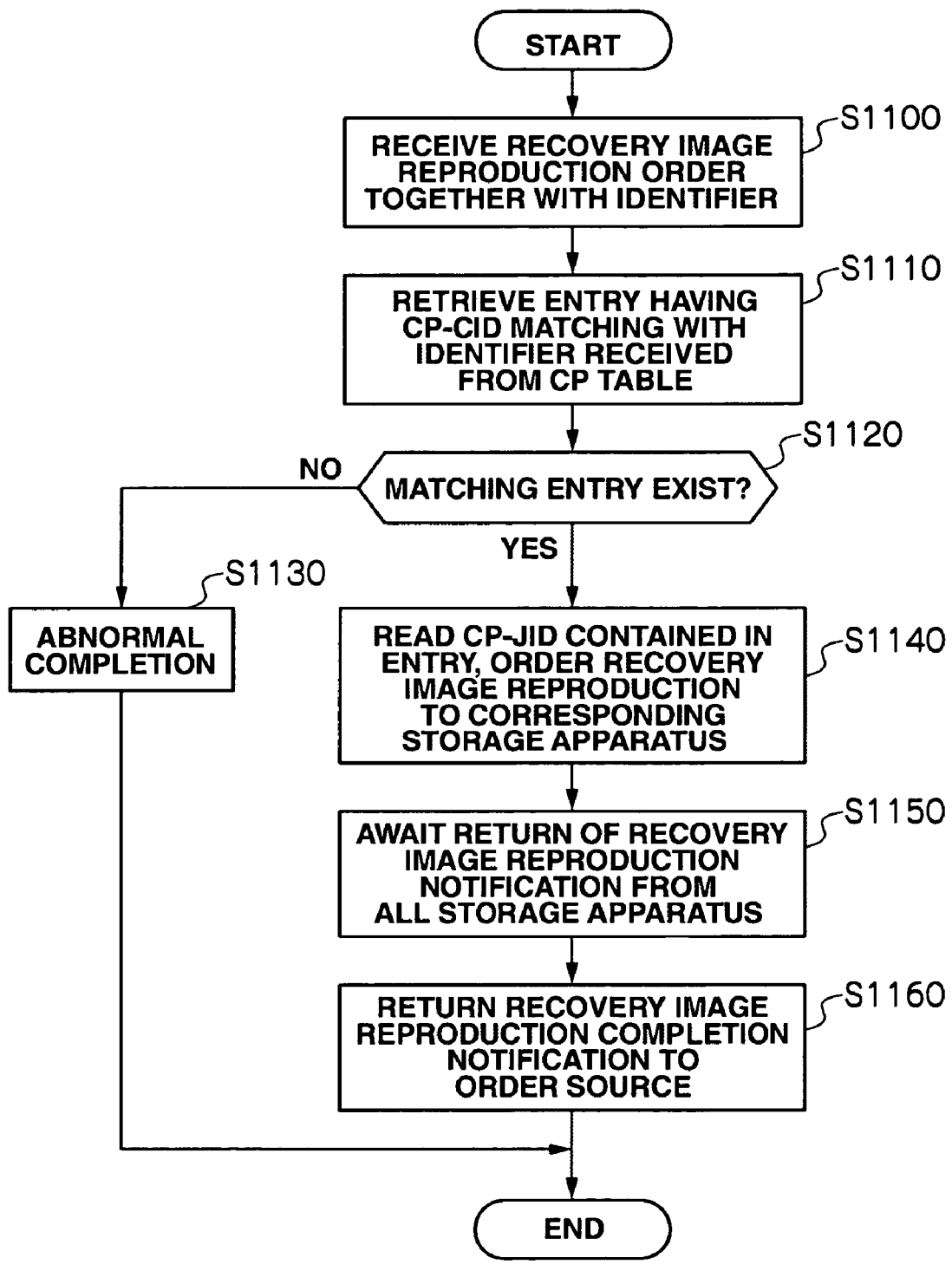
FIG. 8 is a flowchart illustrating a recovery image reproduction process of the first embodiment.

FIG. 8 is a flowchart showing a recovery image reproduction process procedure for the recovery manager 150 of the first embodiment. In this embodiment, the application 140 executes reproduction of the recovery image by designating the identifier registered in the CP-CID171 and ordering the recovery manager 150. The recovery image reproduction process is a process started up by the control unit 110 when the recovery manager 150 orders reproduction of the recovery image.

In step S1100, the recovery manager 150 receives the recovery image reproduction order together with an identifier. Continuing on, in step S1110, the recovery manager 150 searches the CP table 170 for an entry containing CP-CID171 of the same identifier as the received identifier, and checks whether or not a corresponding entry exists in step S1120.

In the event that an entry including the same identifier as the received identifier in the CP-CID171 does not exist, the recovery manager 150 abnormally completes the recovery image reproduction process (step S1130). With regards to this, if an entry containing the same identifier as the received identifier in the CP-CID171 is found, the recovery manager 150 proceeds to step S1140, reads the identifier from the CP-JID172 contained in the entry, and orders recovery reproduction to the storage apparatus 300 containing the corresponding journal group 370.

At this time, the respective storage apparatus 300 are ordered to reproduce recovery image corresponding to the ordered identifier and return notification of completion of recovery image reproduction to the recovery manager 150.

Continuing on, in step S1150, the recovery manager 150 awaits notification of completion of recovery image reproduction from all of the storage apparatus 300. Finally, in step S1160, the recovery manager 150 returns notification of completion of the recovery image reproduction to the source of the recovery image reproduction order.

At the storage system 10, it is then possible to reproduce recovery image for the plurality of storage apparatus 300 corresponding to the single identifier using this kind of recovery image reproduction process.

At the storage system 10, the recovery manager 150 executed by the host computer 100 correlates CP (CP-JID172) registered each apparatus for the plurality of storage apparatus 300 and CP (CP-CID171) where CP registered at the plurality of storage apparatus 300 are grouped.

The application 140 then orders CP acquisition to the recovery manager 150. When the order is received from the application 140, the recovery manager 150 issues CP acquisition orders to the respective storage apparatus 300. When the respective storage apparatus 300 then acquire CP and return identifiers specifying the CP to the recovery manager 150, the recovery manager 150 groups CP for each storage apparatus 300 into CP-JID172, allocates a new identifier to this so as to give CP-CID171, and returns the CP-CID to the application 140.

On the other hand, when the recovery image is reproduced, the application 140 orders the CP-CID171 so as to output a recovery image reproduction order at the recovery manager 150. The recovery manager 150 then obtains a CP-JID172's corresponding to each storage apparatus 300 from CP-CID171, designates CP-JID172's corresponding to the respective storage apparatus 300 and orders recovery image reproduction.

As a result, at the storage system 10, it is possible to collect a plurality of storage apparatus together, acquire CP, and reproduce recovery image corresponding to the CP.

In this embodiment, a description is given of the case where the recovery manager 140 issues various orders to the storage apparatus 300 via the storage network 800 but the present invention is by no means limited in this respect, and it is also possible to instruct the plurality of storage apparatus 300 via the management network 900 by controlling the management apparatus 310. As a result, it is possible to reduce the access load of the storage network 800 at the storage system 10.

(2) SECOND EMBODIMENT

A description is now given of a second embodiment. In this embodiment, a configuration for a system where time information is additionally provided of sufficient precision to specify the order of issuing individual writes at writes issued by the application to the data volumes is disclosed.

A system, for example, installed with z/OS by IBM (International Business Machines Corporation) may be given as a well-known example of a system satisfying these conditions. This z/OS is capable of assigning time information to writes issued to the storage apparatus and this time information has a precision of 1 to 10 microseconds.

Typically, a write to a storage apparatus requires a few hundred microseconds to a few milliseconds and this time information is of a precision sufficient to specify the order of issuing of individual writes. Further, in this embodiment, a configuration is disclosed for a system that records assigned time information as management information for journals and snapshots.

In this embodiment, as described above, a storage system is assumed where time information of sufficient precision can be assigned to all writes and the time information can be recorded as management information for the journals and snapshots. In the description of this embodiment, elements of the configuration that are common to the first embodiment are the same and description thereof is therefore omitted.

Figure 9:
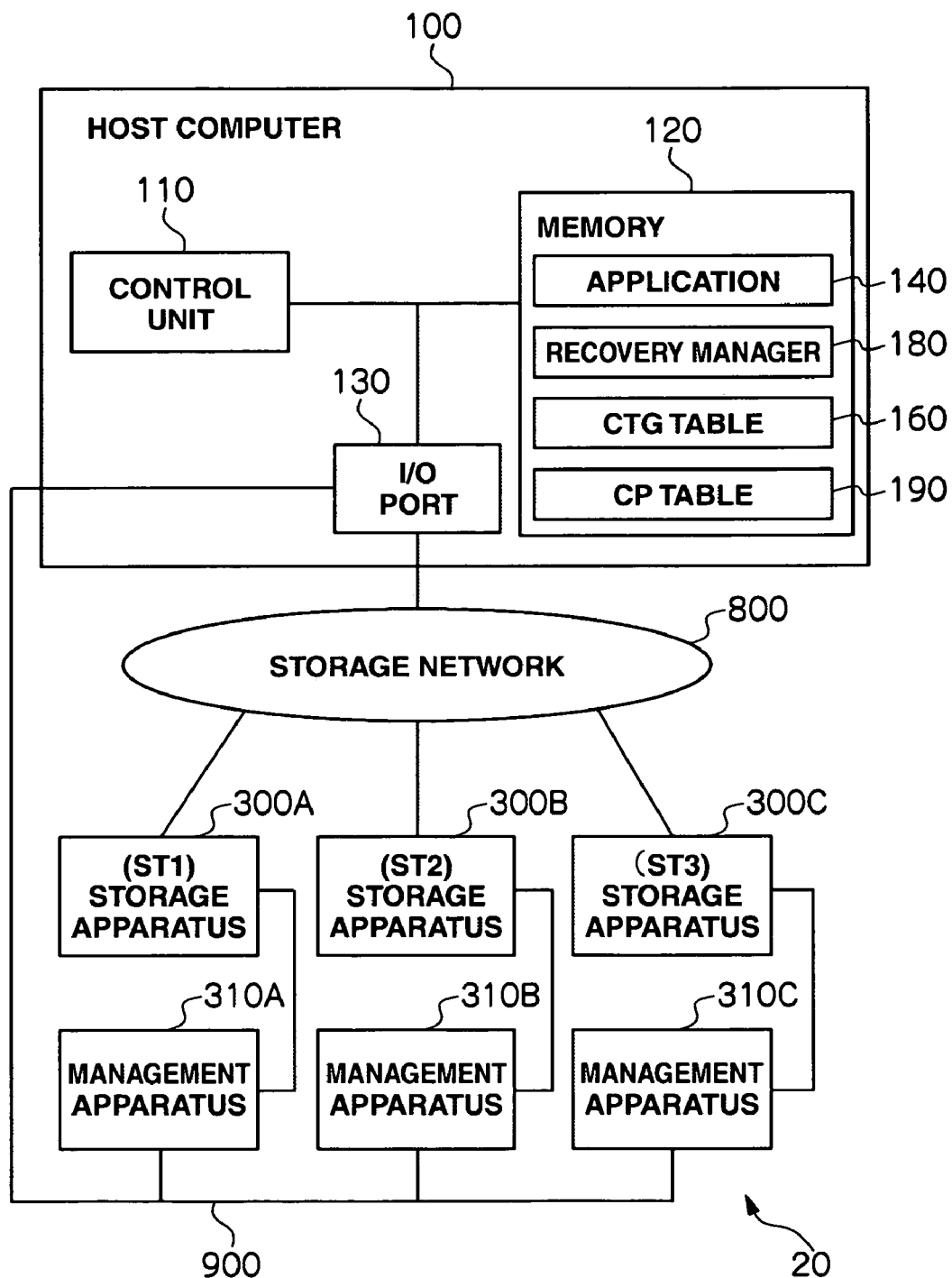
FIG. 9 is an outline view showing a configuration for a storage system of a second embodiment.

FIG. 9 is a view of an overall configuration for a storage system 20 of a second embodiment. The storage system 20 is configured from one or more host computers 100 and a plurality of storage apparatus 300 connected by a storage network 800, as with the first embodiment. In this embodiment, the host computer 100 always assigns time information during issuing of writes to the storage apparatus 300.

Of the elements of the configuration of the host computer 100, the application 140 and the CTG table 160 are the same as the first embodiment. The configuration of a recovery manager 180 and a CP table 190 is peculiar to the second embodiment. The details of the recovery manager 180 and the CP table 190 are described in the following. Moreover, the configuration of the storage apparatus 300 is also the same as in the first embodiment, the journal groups 370 are present, and reproduction of the recovery image is also possible. Moreover, the application 140 uses data volumes 380 included in the plurality of storage apparatus 300, as with the first embodiment.

FIG. 10 is a configuration view of the CP table 190 of the second embodiment. The CP table 190 includes CP-CID191 and CP-TOD192 holding time information. This is different to the CP table 170 of the first embodiment in that, in FIG. 10, elements applied to a number of storage apparatus 300 contained in the configuration of the storage system do not exist.

The details and the method of setting the values contained in CP-CID191 and CP-TOD192 are described later but it should be noted that one CP-TOD192 corresponds to one CP-CID191.

In this way, a set of one CP-CID191 and one CP-TOD192 is referred to as an entry for the CP table 190. Further, the CP table 190 contains a sufficient number of empty entries.

Figure 11:
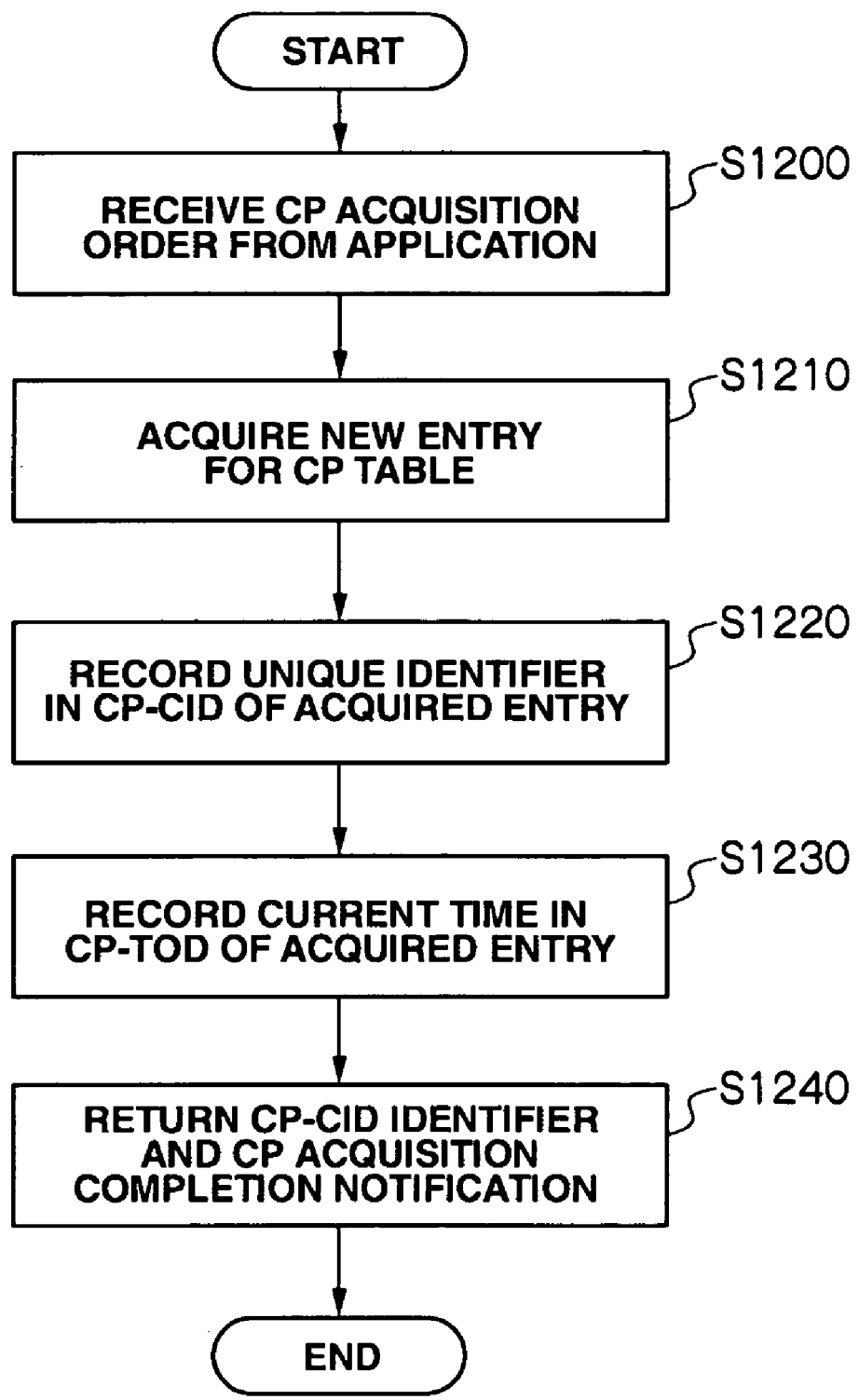
FIG. 11 is a flowchart illustrating a CP acquisition process of the second embodiment.

FIG. 11 is a flowchart of a CP acquisition process of the recovery manager 180 of the second embodiment. In this embodiment, as with the first embodiment, the application 140 orders the recovery manager 180 to acquire a CP. Namely, the CP acquisition process is a process started up by the control unit 110 when the recovery manager 180 receives a CP acquisition order.

In step S1200, the recovery manager 180 receives a CP acquisition order from the application 140. Then, in step S1210, the recovery manager 180 acquires a new entry for the CP table 190. Next, in step S1220, the recovery manager 180 registers a unique identifier at the CP-CID191 of the entry acquired in step S1210.

Continuing on, in step S1230, the recovery manager 180 records the current time in the CP-TOD192 of the acquired entry. Finally, in step S1240, the recovery manager 180 notifies the application 140 of CP acquisition completion and returns an identifier stored in the CP-CID191 as an identifier indicating CP of the journal groups 370 contained in the plurality of storage apparatus 300.

In this embodiment, it should be noted that the CP acquisition process remains with simply using the recovery manager 140 to record information in the CP table 190, and orders to the storage apparatus 300 are not included. As a result, it is possible to reduce the access load of the storage apparatus 300 at the storage system 40.

The storage system 20, in this kind of CP acquisition process, it is possible to implement acquisition of CP spanning journal groups 370 contained in a plurality of storage apparatus 300, and as a result it is possible to reproduce recovery image designating the CP using a single identifier stored in the CP-CID191.

Figure 12:
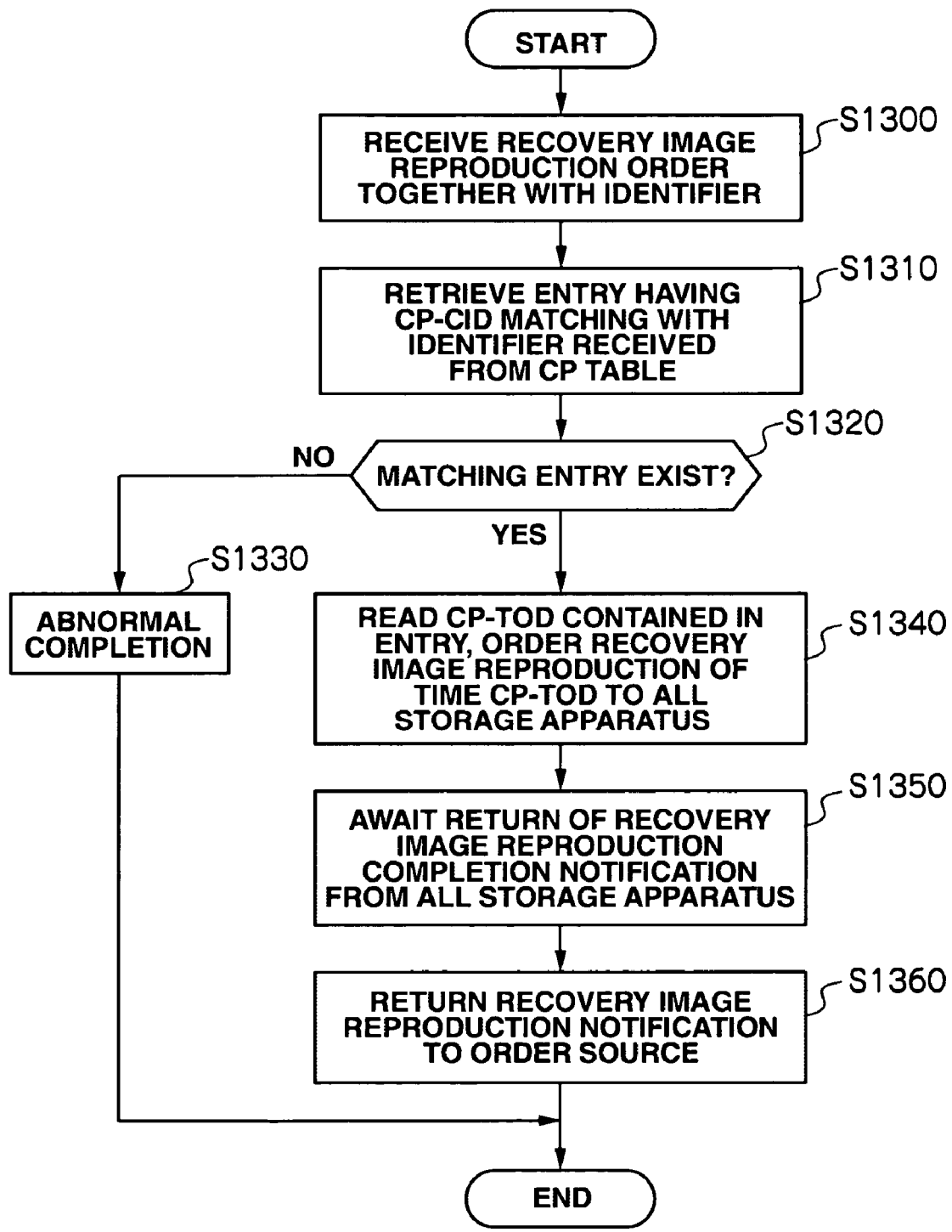
FIG. 12 is a flowchart illustrating a recovery image reproduction process of the second embodiment.

FIG. 12 is a flowchart of a recovery image reproduction process for the recovery manager 180 of the second embodiment. In this embodiment, the application 140 executes reproduction of the recovery image by designating the identifier stored in the CP-CID191 and ordering the recovery manager 180. The recovery image reproduction process is a process started up by the control unit 110 when the recovery manager 180 orders reproduction of the recovery image.

In step S1300, the recovery manager 180 receives the recovery image reproduction order together with an identifier. Continuing on, in step S1310, the recovery manager 180 searches the CP table 190 for an entry containing CP-CID191 of the same identifier as the received identifier, and checks whether or not a corresponding entry exists in step S1320.

In the event that an entry including the same identifier as the received identifier in the CP-CID191 does not exist, the recovery manager 180 abnormally completes the recovery image reproduction process (step S1330). With regards to this, if an entry contained in the CP-CID191 of the same identifier as the received identifier is found, the recovery manager 180 proceeds to step S1340, reads the CP-TOD192 contained in the entry, and orders all of the storage apparatus 300 in such a manner as to reproduce the recovery image of the journal group 370 taking the time as "target time".

At this time, the respective storage apparatus 300 ordered to reproduce the recovery image reproduce recovery image of the ordered "target time" and return notification of completion of recovery image reproduction to the recovery manager 180.

Continuing on, in step S1350, the recovery manager 180 awaits notification of completion of recovery image reproduction from all of the storage apparatus 300. Finally, in step S1360, the recovery manager 180 returns notification of completion of the recovery image reproduction to the source of the recovery image reproduction order.

At the storage system 20, it is then possible to reproduce recovery image for the plurality of storage apparatus 300 corresponding to the single identifier using this kind of recovery image reproduction process.

(3) THIRD EMBODIMENT

A description is now given of a third embodiment. In the first and second embodiments described above, management of CP spanning a plurality of storage apparatus is implemented using a recovery manager. In this embodiment, a method is disclosed of managing CP spanning a plurality of storage apparatus using a storage apparatus rather than a recovery manager. In the description of this embodiment, elements of the configuration that are common to the first embodiment are not described.

Figure 13:
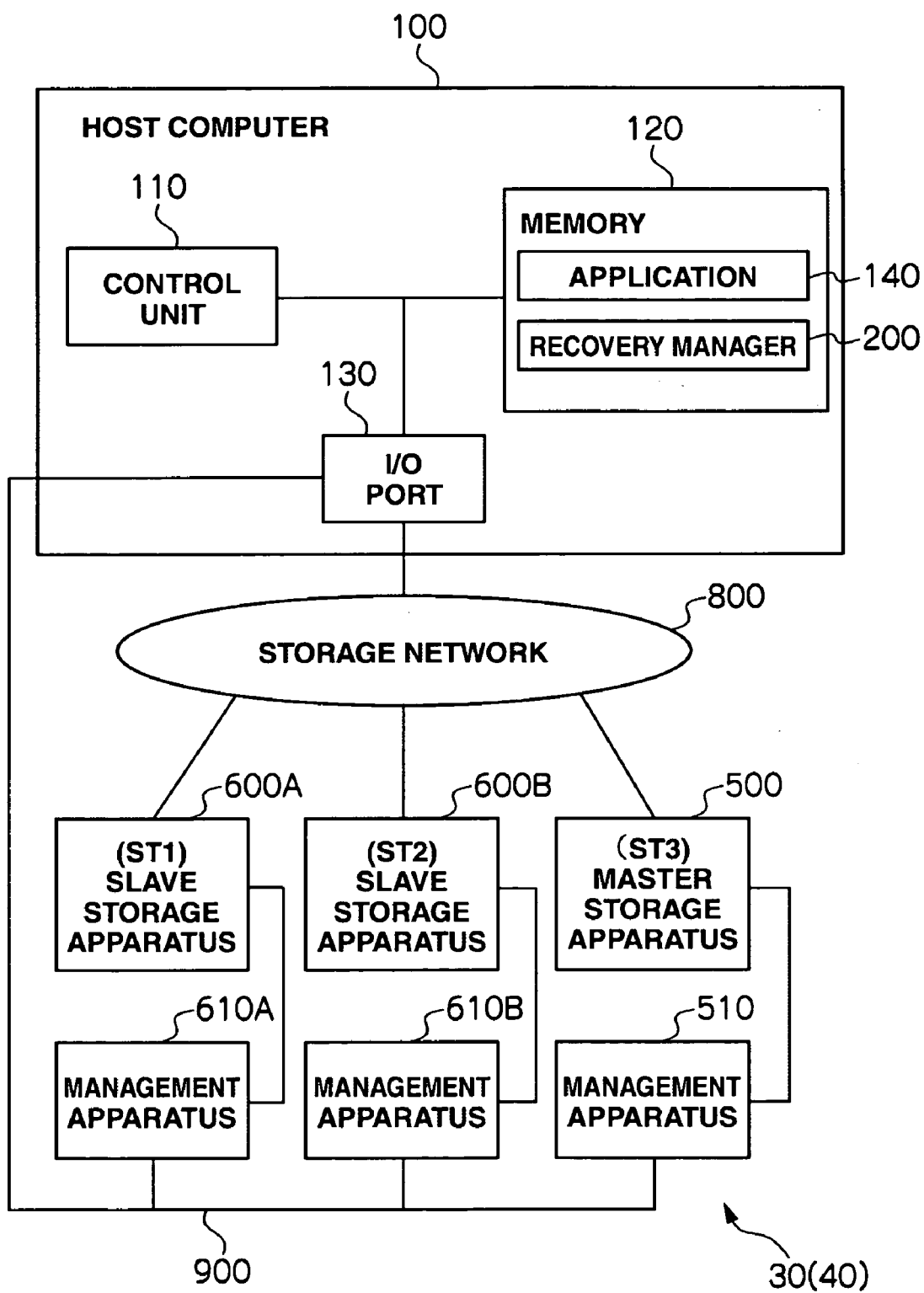
FIG. 13 is an outline view showing a configuration for a storage system of a third embodiment.

FIG. 13 is a view of an overall configuration for a storage system 30 of the third embodiment. This storage system 30 is configured from one or more host computers 100, a single master storage apparatus 500, and a plurality of slave storage apparatus 600 connected by the storage network 800. An example is shown in FIG. 13 of an example configuration of one host computer 100, one master storage apparatus 500 and two slave storage apparatus 600.

The two slave storage apparatus 600 are taken to have identifiers of ST1 and ST2, that are taken to be storage apparatus 600A and storage apparatus 600B, respectively. One master storage apparatus 500 is taken to have an identifier of ST3. The slave storage apparatus 600 has a function that is the same as the storage apparatus 300 of the first and second embodiments. Namely, a journal group 370 is configured and a recovery image is reproduced using this function. In this embodiment, all of the slave storage apparatus 600 have the same configuration.

In this embodiment, the master storage apparatus 500, the slave storage apparatus 600A, and the slave storage apparatus 600B are taken to have management apparatus of management apparatus 510, management apparatus 610A and management apparatus 610B, respectively.

With the exception of functions relating to the master described in the following, the master storage apparatus 500 has the same functions as the storage apparatus 300 of the first and second embodiments. Further, the master storage apparatus 500 may be connected so as to be capable of communication with all of the slave storage apparatus 600 using appropriate communication means. In the example configuration of FIG. 13, the master storage apparatus 500 and the slave storage apparatus 600 are capable of communicating via the storage network 800. The possible employment of other communication means will also be apparent to one skilled in the art.

The host computer 100 has an application 140 and a recovery manager 200. The elements corresponding to the CTG table 160 and the CP table 170 at the host computer 100 of the first embodiment are not particularly essential to the host computer 100 of this embodiment. The recovery manager 200 of this embodiment orders CP acquisition and recovery image reproduction to just one master storage apparatus 500.

Figure 14:
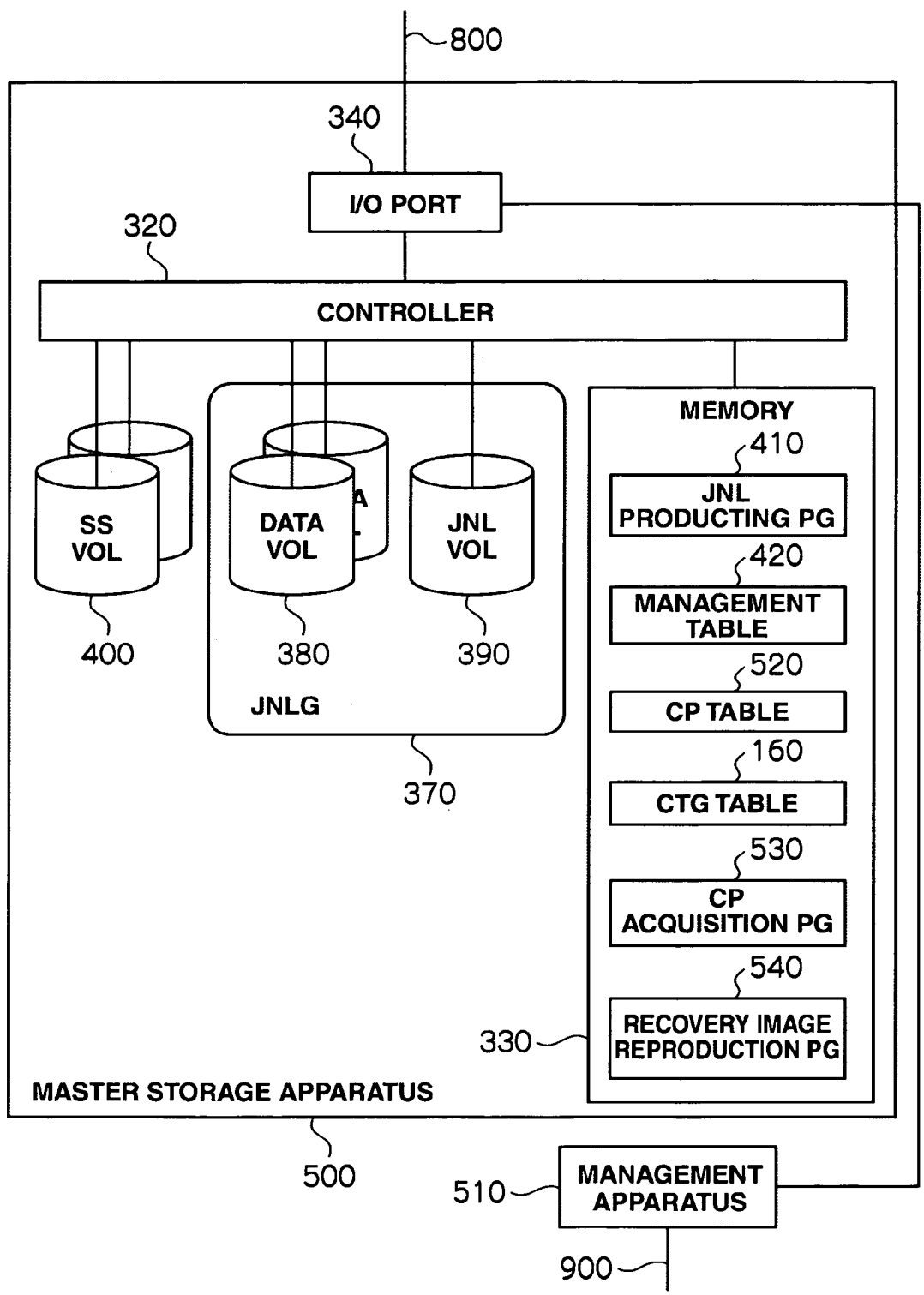
FIG. 14 is an outline view showing a configuration of a master storage apparatus of the third embodiment.

FIG. 14 is a configuration view of the master storage apparatus 500 of the third embodiment. The master storage apparatus 500 includes many of the same configuration elements as the storage apparatus 300. The controller 320, memory 330, I/O port 340, physical volumes 350, logical volumes 360, and management apparatus 410 have exactly the same configuration as for the storage apparatus 300.

Further, the journal group 370 and data volumes 380 and journal volumes 390 contained in the journal group 370, and the snapshot volumes 400 corresponding to the data volumes 380 of the master storage apparatus 500 are the same as for the storage apparatus 300.

Further, the journal producing program 410 using the journal group 370 to acquire journals and snapshots, and the management table 420 used for the journal making program 410 to manage the journal group 220 for the master storage apparatus 500 are also the same as for the storage apparatus 300.

Moreover, the ability of the master storage apparatus 500 to utilize these configuration elements to accumulate writes by the application 140 to the data volume 380 in the journal volume 390 as journals, accumulate CP acquisition orders acquired via the information input apparatus from the application 140 or from the user in the journal volume 390 as special journals, acquire snapshots of the data volumes 380 at appropriate intervals at the snapshot volume 400, and utilize the journals and snapshots to reproduce recovery image corresponding to the ordered CP is also the same as for the storage apparatus 300.

The application 140 uses data volumes 380 contained in the one master storage apparatus 500 and the plurality of slave storage apparatus 600. The master storage apparatus 500 and each slave storage apparatus 600 are capable of reproducing recovery image for the same time by grouping data volumes 380 within the respective storage apparatus at the journal group 370.

In addition to this configuration, as elements of the configuration contained only at the master storage apparatus 500, the master storage apparatus 500 includes a CP table 520, a CP acquisition program (CP acquisition PG) 530, and a recovery image reproduction program (recovery image reproduction PG) 540. These are stored in the memory 330 of the master storage apparatus 500 and the CP acquisition program 530 and the recovery image reproduction program 540 are executed by the controller 320.

The CTG table 160 has exactly the same configuration as the CTG table 160 possessed by the host computer 100 described for the first embodiment. In this embodiment, management of the CTG is performed by the master storage apparatus 500 and the master storage apparatus 500 is therefore in possession of the CTG table 160.

As a result, at the storage system 30, as a result of the master storage apparatus 500 communicating appropriately with all of the slave storage apparatus 600, it is possible to group the data volumes 380 contained in the master storage apparatus 500 and the plurality of slave storage apparatus 600 and to reproduce the recover image simply by the recovery manager 200 ordering one master storage apparatus 500.

Figure 15:
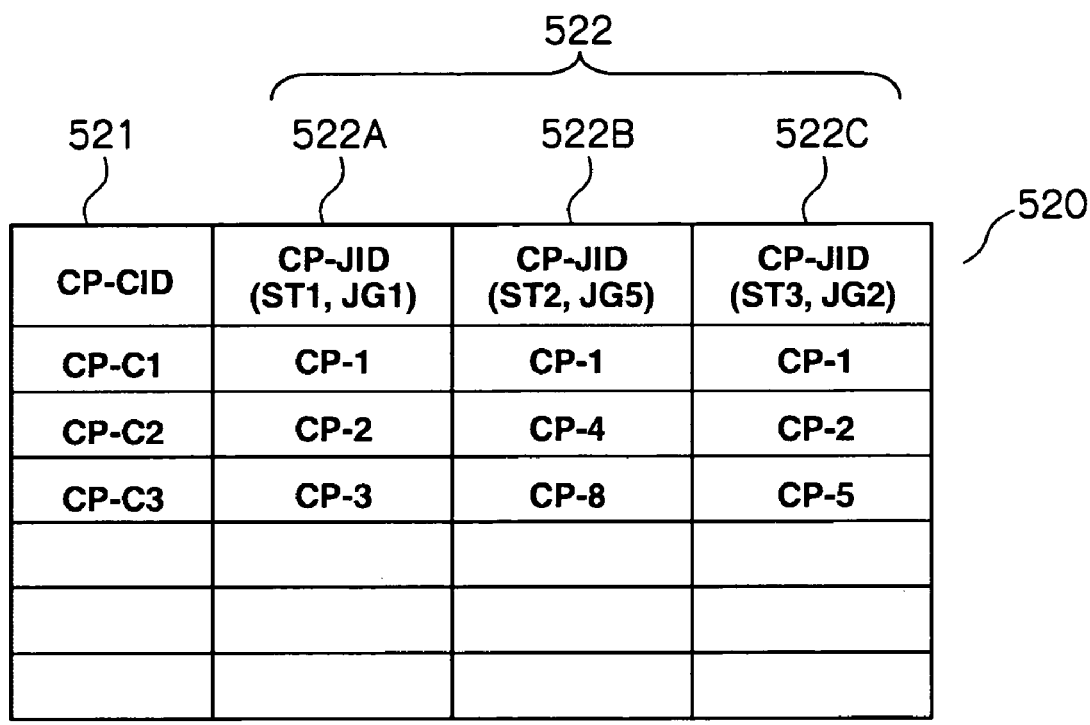
FIG. 15 is an outline view showing a configuration for a CP table of the third embodiment.

FIG. 15 is a configuration view of the CP table 520 of the third embodiment. The CP table 520 includes CP-JID522 (522A to 522C) corresponding to journal tables 370 contained in the master storage apparatus 500 and each of the respective slave storage apparatus 600 and CP-CID521 expressing a grouped check point where the CP-JID's 522 are grouped together and managed as a group. In FIG. 15, an example is shown of a CP table 520 for a configuration for a storage system having one master storage apparatus 500 and two slave storage apparatus 600 as shown in FIG. 13.

The details of the values included in CP-CID521 and CP-JID522 and the method of setting these values are described in detail later but it should be noted that a CP-JID522 exists for each journal group 370 contained in one master storage apparatus 500 and two slave storage apparatus 600 in a manner corresponding to one CP-CID521. For example, CP-JID522C of FIG. 15 corresponds to the journal group 370 of JG2 occurring at the master storage apparatus 500 of ST3.

In this embodiment, a set of one CP-CID521 and a CP-JID522 corresponding to a journal group 370 contained in the master storage apparatus 500 and the plurality of slave storage apparatus 600 is referred to as an entry of the CP table 520. Further, the CP table 520 contains a sufficient number of empty entries.

Figure 16:
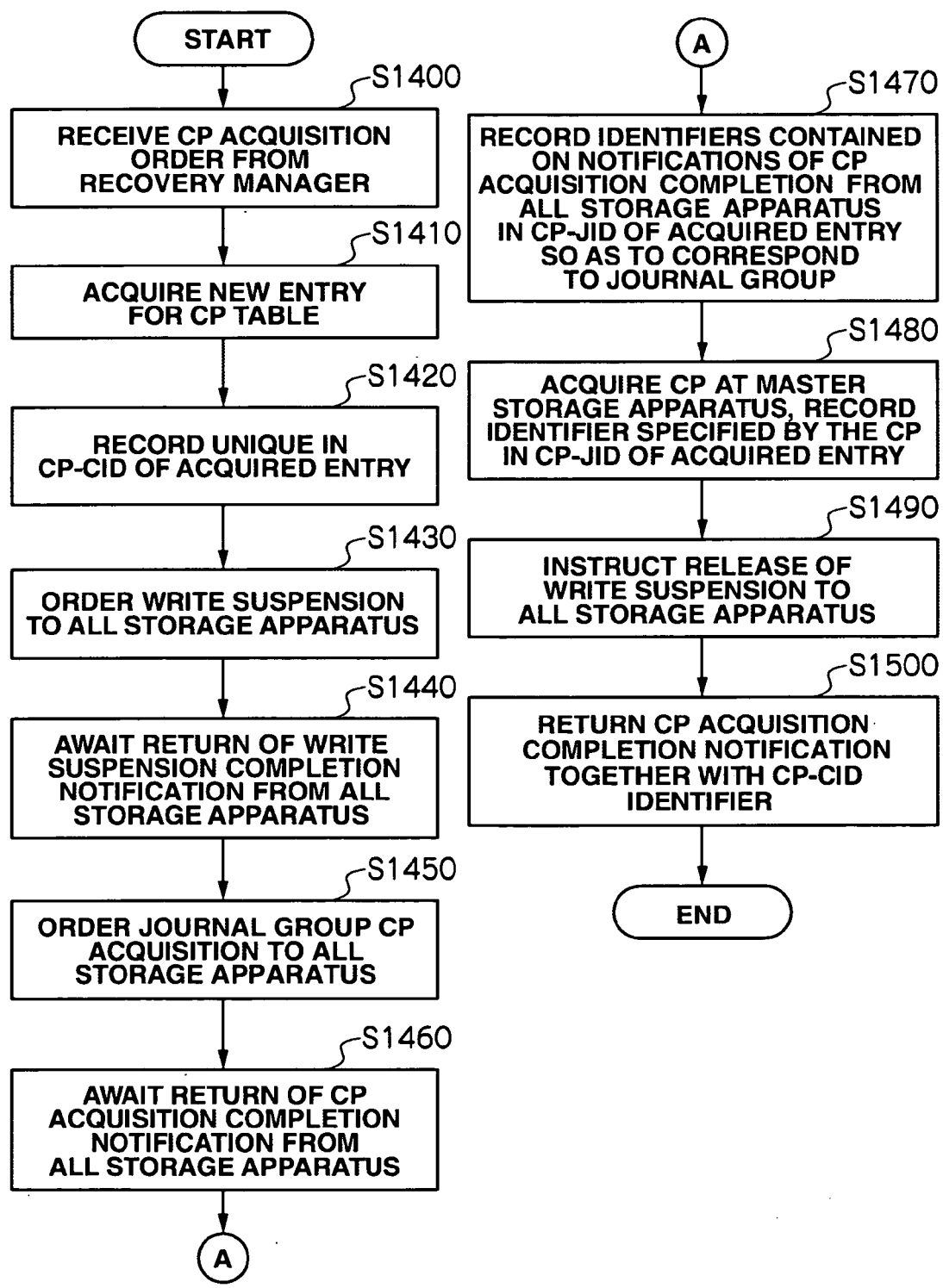
FIG. 16 is a flowchart illustrating a CP acquisition process of the third embodiment.

FIG. 16 is a flowchart showing a CP acquisition process procedure for the CP acquisition program 530 of the third embodiment. In this embodiment, the application 140 orders the recovery manager 200 to acquire CP. The recovery manager 200 orders the master storage apparatus 500 to acquire CP. Namely, the CP acquisition process is a process started up by the controller 320 upon the CP acquisition program 530 of the master storage apparatus 500 receiving a CP acquisition order from the recovery manager 200.

In step S1400, the CP acquisition program 530 receives a CP acquisition order from the recovery manager 200. Next, in step S1410, the CP acquisition program 530 acquires a new entry of the CP table 520. Then, in step S1420, the CP acquisition program 530 records a unique identifier at the CP-CID521 of the entry acquired in the step S1410.

After this, the CP acquisition program 530 outputs write suspension orders to the master storage apparatus 500 and all of the slave storage apparatus 600 (step S1430), and waits for notification of write suspension completion to be returned from all of the slave storage apparatus 600 of the master storage apparatus 500 (step S1440).

Next, in step S1450, the CP acquisition program 530 orders CP acquisition to the journal groups 370 of all of the slave storage apparatus 600.

At this time, slave storage apparatus 600 receiving the CP acquisition orders store CP in the journal groups 370 contained in the respective slave storage apparatus 600 and returns an identifier specifying the acquired CP to the CP acquisition program 530 together with CP acquisition completion notification.

After this, in step S1460, the CP acquisition program 530 receives notification of CP acquisition completion from the respective slave storage apparatus 600 and records identifiers indicating CP acquired by the respective journal groups 220 contained in the CP acquisition completion notifications in CP-JID522 corresponding to the journal groups of the entry acquired in step S1410 (step S1470).

Next, in step S1480, the CP acquisition program 530 acquires CP for the journal group 370 the master storage apparatus 500 is itself in possession of and records an identifier specifying the CP in the CP-JID522 corresponding to the journal group the master storage apparatus 500 is in possession of for the entry acquired in step S1410. Next, the CP acquisition program 530 orders write suspension release to the master storage apparatus 500 and all of the slave storage apparatus 600 (step S1490).

Finally, in step S1500, the CP acquisition program 530 gives notification of CP acquisition completion to the recovery manager 200, and returns the identifier stored in CP-CID521 as an identifier indicating a CP that is the CP acquired by the journal groups 370 of the master storage apparatus 500 and all of the slave storage apparatus 600 grouped.

At the storage system 30 it is then possible to instruct CP stored in each of the journal groups 370 contained in the master storage apparatus 500 and the plurality of slave storage apparatus 600 as a group using the single identifier stored in the CP-CID521 using this kind of CP acquisition program 530.

Figure 17:
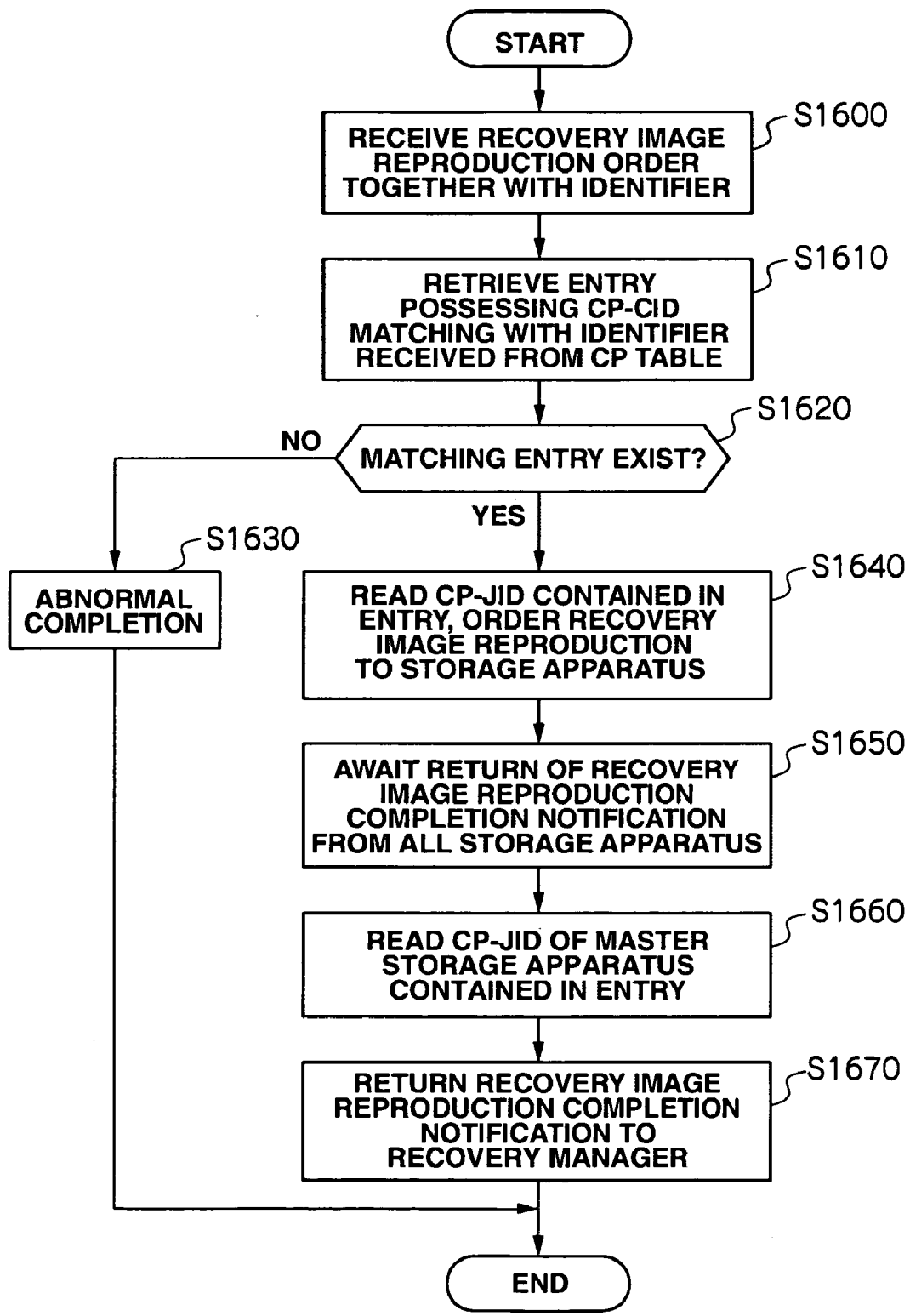
FIG. 17 is a flowchart illustrating a recovery image reproduction process of the third embodiment.

FIG. 17 is a flowchart showing a recovery image reproduction processing procedure of the recovery image reproduction program 540 of the third embodiment. In this embodiment, the application 140 executes reproduction of the recovery image by designating the identifier registered in the CP-CID521 and ordering the recovery manager 200. The recovery manager 200 orders the master storage apparatus 500 of the identifier and orders recovery image reproduction. The recovery image reproduction process is a process started up by the controller 320 when the recovery image reproduction program 540 of the master storage apparatus 500 orders recovery image reproduction to the recovery manager 200.

In step S1600, the recovery image reproduction program 540 receives the recovery image reproduction order together with an identifier. Continuing on, in step S1610, the recovery image reproduction program 540 searches the CP table 520 for an entry containing CP-CID521 of the same identifier as the received identifier, and checks whether or not a corresponding entry exists in step S1620.

In the event that an entry including the same identifier as the received identifier in the CP-CID521 does not exist for the recovery image reproduction program 540, the recovery image reproduction program 540 ends in an abnormal manner (step S1630). With regards to this, if an entry containing the same identifier as the received identifier in the CP-CID521 is found, the recovery image reproduction program 540 proceeds to step S1640, reads the identifier from the CP-JID552 contained in the entry, and orders recovery reproduction to all of the slave storage apparatus 600 containing the corresponding journal group 370.

At this time, the respective slave storage apparatus 600 is ordered to reproduce recovery image corresponding to the ordered identifier and return notification of completion of recovery image reproduction to the recovery image reproduction program 540.

Continuing on, in step S1650, the recovery image reproduction program 540 awaits notification of completion of recovery image reproduction from all of the slave storage apparatus 600. Next, in step S1660, the recovery image reproduction program 540 reads the identifier from CP-JID522 corresponding to the journal group 370 possessed by the master storage apparatus 500 and reproduces CP recovery image specified by this identifier. Finally, the recovery image reproduction program 540 returns notification of completion of the recovery image reproduction to the recovery manager 200 in step S1670.

At the storage system 30, it is then possible to reproduce recovery image for the master storage apparatus 500 and the plurality of slave storage apparatus 600 corresponding to the single identifier using processing of this kind of recovery image reproduction program 540.

It should be noted that the recovery manager 200 of this embodiment outputs orders only to the master storage apparatus 400. As a result, it is possible to reduce the load of the host computer 100 at the storage system 30.

(4) FOURTH EMBODIMENT

A description is now given of a fourth embodiment. In this embodiment, as described for the second embodiment, a storage system is assumed where time information of sufficient precision can be assigned to all writes and the time information can be recorded as management information for the journals and snapshots. Further, in this embodiment, as with the third embodiment, a method is disclosed of managing CP spanning a plurality of storage apparatus using a storage apparatus rather than a recovery manager. In the description of this embodiment, elements of the configuration that are common to the third embodiment are not described.

The overall configuration of the storage system 40 of this embodiment is the same as for the third embodiment. Namely, this is as shown in FIG. 13. However, in this embodiment it should be noted that the host computer 100 always assigns time information during issuing writes to the master storage apparatus 500 and slave storage apparatus 600.

Figure 18:
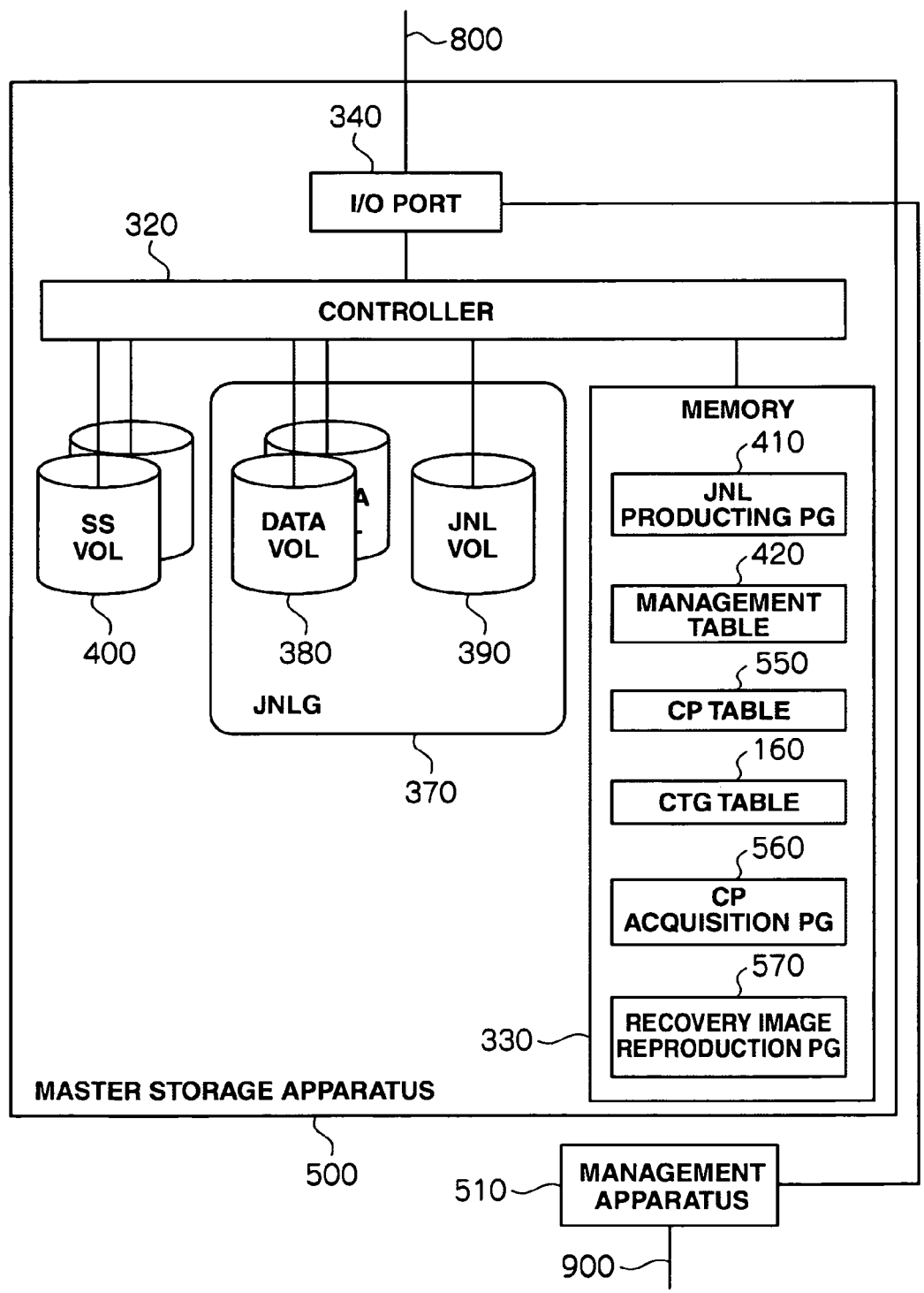
FIG. 18 is an outline view showing a configuration of a master storage apparatus of a fourth embodiment.

FIG. 18 is a configuration view of the master storage apparatus 500 of the fourth embodiment. The master storage apparatus 500 of this embodiment is basically the same as the master storage apparatus 500 of the third embodiment. The master storage apparatus 500 includes a CP table 550, CP acquisition program 560, and recovery image reproduction program 570 as configuration elements specific to this embodiment. These are stored in the memory 330 of the master storage apparatus 500 and the CP acquisition program 560 and the recovery image reproduction program 570 are executed by the controller 320.

As with the third embodiment, the application 140 uses data volumes 380 contained in the one master storage apparatus 500 and the plurality of slave storage apparatus 600. The master storage apparatus 500 and each slave storage apparatus 600 are capable of reproducing recovery image for the same time by grouping data volumes 380 within the master storage apparatus 500 and the respective slave storage apparatus 600 at the journal group 370.

Further, in this embodiment, as a result of the master storage apparatus 500 communicating appropriately with all of the slave storage apparatus 600, it is possible to group the data volumes 380 contained in the master storage apparatus 500 and the plurality of slave storage apparatus 600 and to reproduce the recover image simply by the recovery manager 200 ordering one master storage apparatus 500, as with the third embodiment.

FIG. 19 is a configuration view of the CP table 550 of the fourth embodiment. The CP table 550 includes CP-CID551 and CP-TOD552 holding time information. A difference from the CP table 520 of the third embodiment is that, in FIG. 19, elements spanning a number of the master storage apparatus 500 and the slave storage apparatus 600 do not exist in the system configuration.

The details and the method of setting the values contained in CP-CID551 and CP-TOD552 are described later but it should be noted that one CP-TOD552 exists so as to correspond to one CP-CID551.

In this way, a set of one CP-CID551 and one CP-TOD552 is referred to as an entry for the CP table 550. Further, the CP table 550 contains a sufficient number of empty entries.

Figure 20:
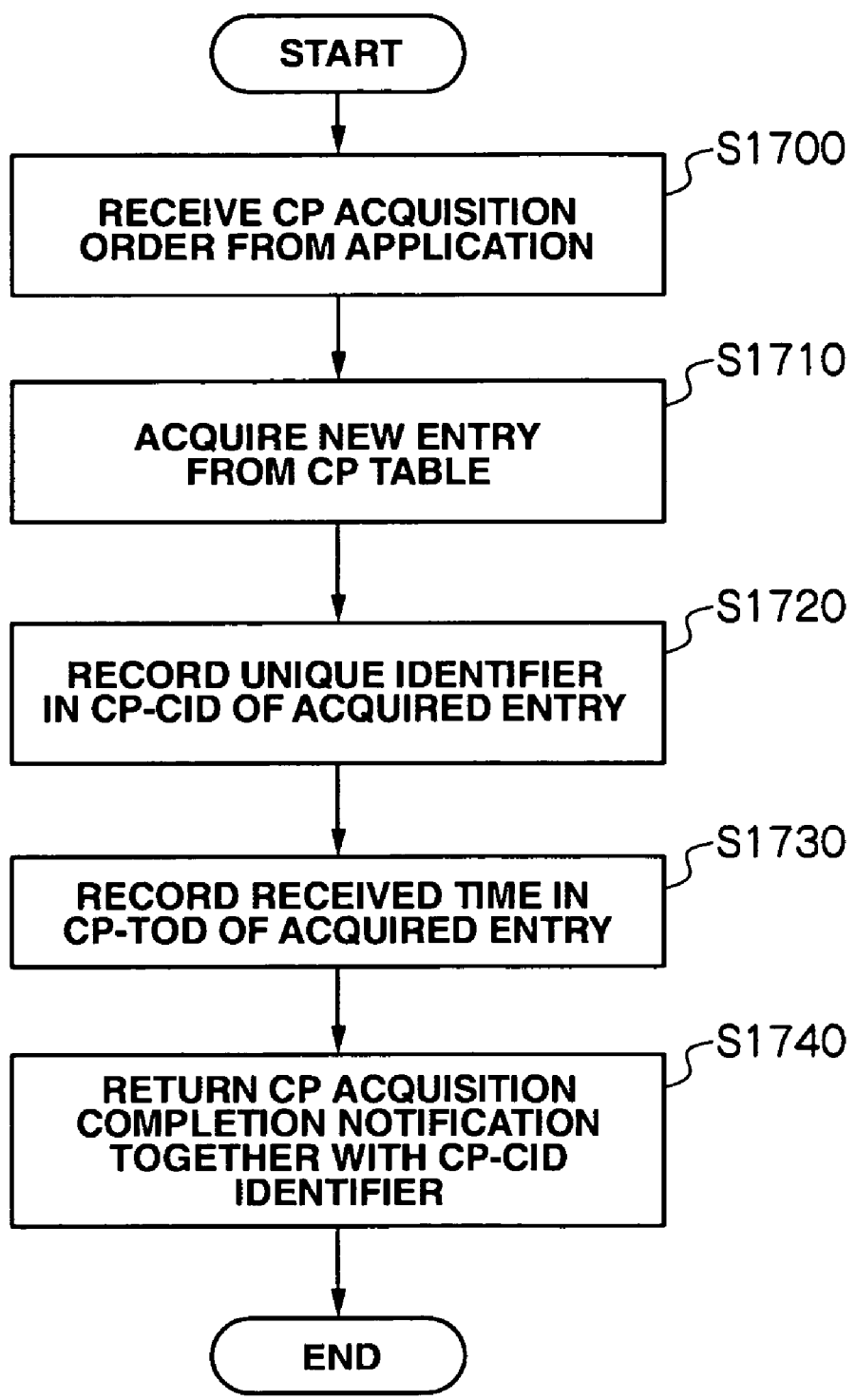
FIG. 20 is a flowchart illustrating a CP acquisition process of the fourth embodiment.

FIG. 20 is a flowchart of the CP acquisition program 560 of the fourth embodiment. In this embodiment, as with the third embodiment, the application 140 orders the recovery manager 200 to acquire CP. The recovery manager 200 orders the master storage apparatus 500 to acquire CP.

The CP acquisition process is a process started up by the controller 320 upon the CP acquisition program 560 of the master storage apparatus 500 receiving a CP acquisition order from the recovery manager 200. During this time, the same time information as the time information assigned to the write is included in the order.

In step S1700, the CP acquisition program 560 receives a CP acquisition order from the recovery manager 200. Next, in step S1710, the CP acquisition program 560 acquires a new entry of the CP table 550. Then, in step S1720, the CP acquisition program 560 records a unique identifier at the CP-CID551 of the entry acquired in the step S1710.

Continuing on, in step S1730, the CP acquisition program 560 records the time received from the recovery manager 200 in the CP-TOD552 for the acquired entry. Finally, in step S1740, the CP acquisition program 560 gives notification of CP acquisition completion to the recovery manager 200, and returns the identifier stored in CP-CID551 as an identifier indicating a CP occurring at the journal groups 370 included at the master storage apparatus 500 and the plurality of slave storage apparatus 600.

In this embodiment, it should be noted that the CP acquisition process simply uses the master storage apparatus 500 to record information in the CP table 550, and orders to the slave storage apparatus 600 are not included. As a result, it is possible to reduce the access load of the slave storage apparatus 600 at the storage system 40.

With the storage system 40, in this kind of CP acquisition process, it is possible to implement acquisition of CP spanning journal groups 370 contained in the master storage apparatus 400 and the plurality of slave storage apparatus 600, and as a result it is possible to reproduce recovery image designating the CP using a single identifier stored in the CP-CID551.

Figure 21:
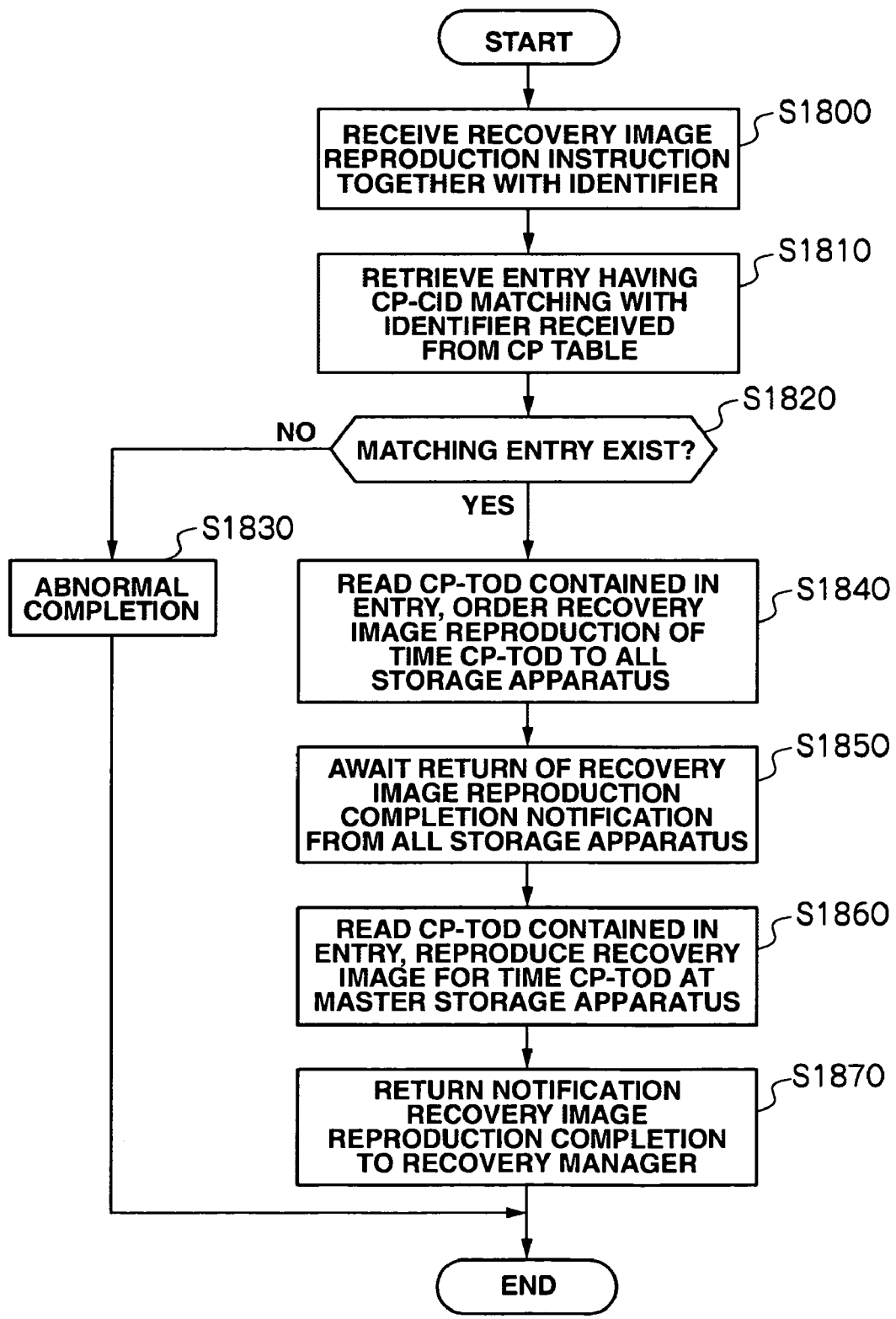
FIG. 21 is a flowchart illustrating a recovery image reproduction process of the fourth embodiment.

FIG. 21 is a flowchart showing a recovery image reproduction procedure of the recovery image reproduction program 570 of the fourth embodiment. In this embodiment, the application 140 executes reproduction of the recovery image by designating the identifier stored in the CP-CID551 and ordering the recovery manager 200. The recovery manager 200 orders the master storage apparatus 500 of the identifier and orders recovery image reproduction.

The recovery image reproduction process is a process started up by the controller 320 when the recovery image reproduction program 570 of the master storage apparatus 500 orders recovery image reproduction from the recovery manager 200.

In step S1800, the recovery image reproduction program 570 receives the recovery image reproduction order together with an identifier. Continuing on, in step S1810, the recovery image reproduction program 570 searches the CP table 550 for an entry containing CP-CID551 of the same identifier as the received identifier, and checks whether or not a corresponding entry exists in step S1820.

In the event that an entry including the same identifier as the received identifier in the CP-CID551 does not exist for the recovery image reproduction program 570, the recovery image reproduction program 570 ends in an abnormal manner (step S1830). With regards to this, if an entry contained in the CP-CID551 of the same identifier as the received identifier is found, the recovery image reproduction program 570 proceeds to step S1840, reads the CP-TOD552 contained in the entry, and orders all of the slave storage apparatus 600 in such a manner as to reproduce the recovery image of the journal group 370 taking the time as "target time".

At this time, the respective slave storage apparatus 600 ordered to reproduce recovery image of the ordered time and return notification of completion of recovery image reproduction to the recovery image reproduction program 570.

Continuing on, in step S1850, the recovery image reproduction program 570 awaits notification of completion of recovery image reproduction from all of the slave storage apparatus 600.

In step S1860, the recovery image reproduction program 570 reproduces recovery image taking the time displayed at the CP-TOD552 of the journal group 370 the master storage apparatus 500 is itself in possession of as the "target time". Finally, the recovery image reproduction program 570 returns notification of completion of the recovery image reproduction to the recovery manager 200 in step S1870.

At the storage system 40, it is then possible to reproduce recovery image for the master storage apparatus 500 and the plurality of slave storage apparatus 600 corresponding to the single identifier using processing of this kind of recovery image reproduction program 570.

It should be noted that the recovery manager 200 of this embodiment outputs orders only to the master storage apparatus 500. As a result, it is possible to reduce the processing load of the host computer 100 at the storage system 40.

The present invention can therefore be applied to carrying out data recovery in storage systems constituted by a plurality of storage apparatus.

What is claimed is:

1. A storage system comprising:
   a host computer for transmitting and receiving data;
   a plurality of storage apparatuses provided with volumes for storing the data sent by the host computer;
   a check point setting unit for setting check points as markers during recovery of each volume of the plurality of storage apparatuses;
   a check point management unit for managing the check points set by the check point setting unit; and
   a recovery order unit for ordering recovery of the volumes up to the state of the check point for each of the volumes managed by the check point management unit to the plurality of storage apparatuses;
   wherein the check point management unit and the recovery order unit are provided at a predetermined storage apparatus as a master storage apparatus of the plurality of storage apparatuses, and the recovery order unit orders recovery of the volumes up to the state of the check point for each of the volumes managed by the check point management unit to the plurality of storage apparatuses based on orders from the host computer.

2. The storage system according to claim 1, wherein the check point setting unit sets the check points at arbitrary times.

3. The storage system according to claim 1, wherein the check point setting unit sets the check points at times corresponding to user orders.

4. The storage system according to claim 1, wherein the check point setting unit sets times of writing predetermined data to the volumes recognized by the host apparatus as check points.

5. The storage system according to claim 1, wherein the check point setting unit sets the check points for the plurality of storage apparatuses as a group using a consistency group.

6. The storage system according to claim 1, wherein the check point setting unit sets the check points respectively at the volumes of the plurality of storage apparatuses, the check point management unit manages each of the check points set by the check point setting unit as a group, and the recovery order unit orders storage apparatuses corresponding to the check points to recover the volumes up to the state of the check point for each of the volumes managed by the check point management unit.

7. The storage system according to claim 1, wherein the check point setting unit sets times as the check points.

8. A recovery method for a storage system having a host computer for transmitting and receiving data, and a plurality of storage apparatuses provided with volumes for storing the data sent by the host computer, comprising:
   a first step of setting check points as markers during recovery of each volume of the plurality of storage apparatuses;
   a second step of managing the check points set in the first step; and
   a third step of ordering the plurality of storage apparatuses to recover the volumes up to the state of the check point for each of the volumes managed in the second step,
   wherein the second and third steps are provided at a predetermined storage apparatus as a master storage apparatus of the plurality of storage apparatuses, and wherein the third step further orders recovery of the volumes up to the state of the check point for each of the volumes managed by the third step to the plurality of storage apparatuses based on orders from the host computer.

9. The recovery method for a storage system according to claim 8, wherein the first step sets the check points at arbitrary times.

10. The recovery method for a storage system according to claim 8, wherein the first step sets the check points at times corresponding to user orders.

11. The recovery method for a storage system according to claim 8, wherein the first step sets times of writing predetermined data to the volumes recognized by the host apparatus as check points.

12. The recovery method for a storage system according to claim 8, wherein the first step sets the check points for the plurality of storage apparatuses as a group using a consistency group.

13. The recovery method for a storage system according to claim 8, wherein the first step sets the check points respectively at the volumes of the plurality of storage apparatuses, the second step manages each of the check points set in the first step as a group, and the third step orders storage apparatus corresponding to the check points to recover the volumes up to the state of the check point for each of the volumes managed in the second step.

14. The recovery method for a storage system according to claim 8, wherein the first step sets times as the check points.

* * * * *